United States Patent [19]

Toal et al.

[11] 4,051,605
[45] Oct. 4, 1977

[54] COMPETITIVE EDUCATIONAL CALCULATOR

[75] Inventors: Ted William Toal, Sunnyvale; Ralph Warren Haines, San Jose, both of Calif.

[73] Assignee: National Semiconductor Corporation, Santa Clara, Calif.

[21] Appl. No.: 720,538

[22] Filed: Sept. 7, 1976

[51] Int. Cl.$^2$ .................... G09B 19/02; G06F 15/16
[52] U.S. Cl. ........................................ 35/30; 35/9 B; 35/31 R; 35/48 R
[58] Field of Search .................... 35/6, 9 A, 9 R, 9 B, 35/8 R, 30, 31 R, 31 C, 48 R; 235/152, 156; 339/19; 340/172.5

[56] References Cited

U.S. PATENT DOCUMENTS

| | | | |
|---|---|---|---|
| 3,371,321 | 2/1968 | Adams | 35/8 R |
| 3,584,398 | 6/1971 | Meyer et al. | 35/31 C |
| 3,673,392 | 6/1972 | Holm | 235/156 |
| 3,787,988 | 1/1974 | Nakajima et al. | 35/6 X |
| 3,934,229 | 1/1976 | Cochran et al. | 340/172.5 |
| 3,944,983 | 3/1976 | Gale | 340/172.5 |
| 3,971,925 | 7/1976 | Wenninger | 340/172.5 X |
| 3,974,575 | 8/1976 | Duncan | 35/31 R |

Primary Examiner—Richard C. Pinkham
Assistant Examiner—Vance Y. Hum
Attorney, Agent, or Firm—Gail W. Woodward; Willis E. Higgins

[57] ABSTRACT

An educational calculator is provided with means for generating parameters describing a problem to be solved. The user metally solves a problem and inserts the answer to the problem into the calculator. If the user has answered correctly, the calculator lights a green light and displays the problem with the correct answer. If the user answers incorrectly, the calculator displays an error signal. The user is given a second try to answer the problem and, if he fails again, the correct answer is flashed and a new problem is displayed. The calculator keeps track of the number of problems the user has answered correctly. Means are provided within the calculator to permit the calculator to operate in competition with another identical educational calculator. When a cable is connected between two calculators, the calculators are energized to be in the competition mode and only one of the calculators is energized to be a "master" calculator. The other calculator is designated as the "slave." The type of problem to be solved is generated in the master calculator and is transmitted to the slave. The problem is then dislayed on both calculators and two users compete against each other and against time in solving a number of problems presented by the master calculator. A score is kept by each calculator and is displayed. At the end of a predetermined number of problems, the competition is over and the final score is displayed.

14 Claims, 5 Drawing Figures

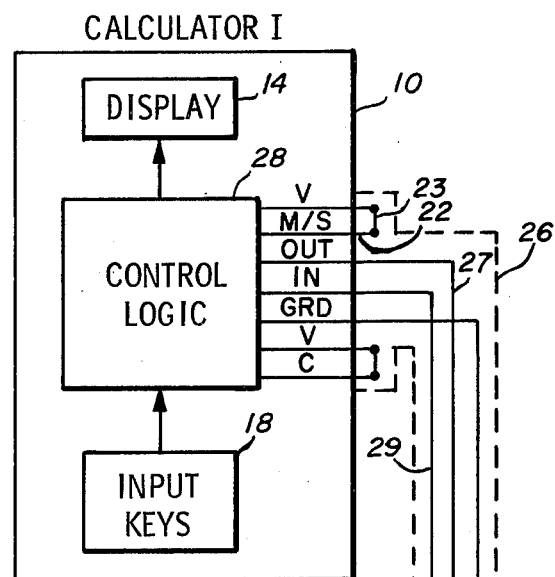
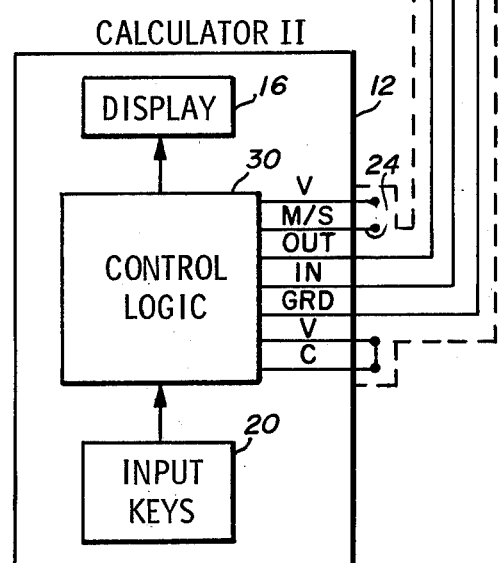
Fig_1
Fig_2

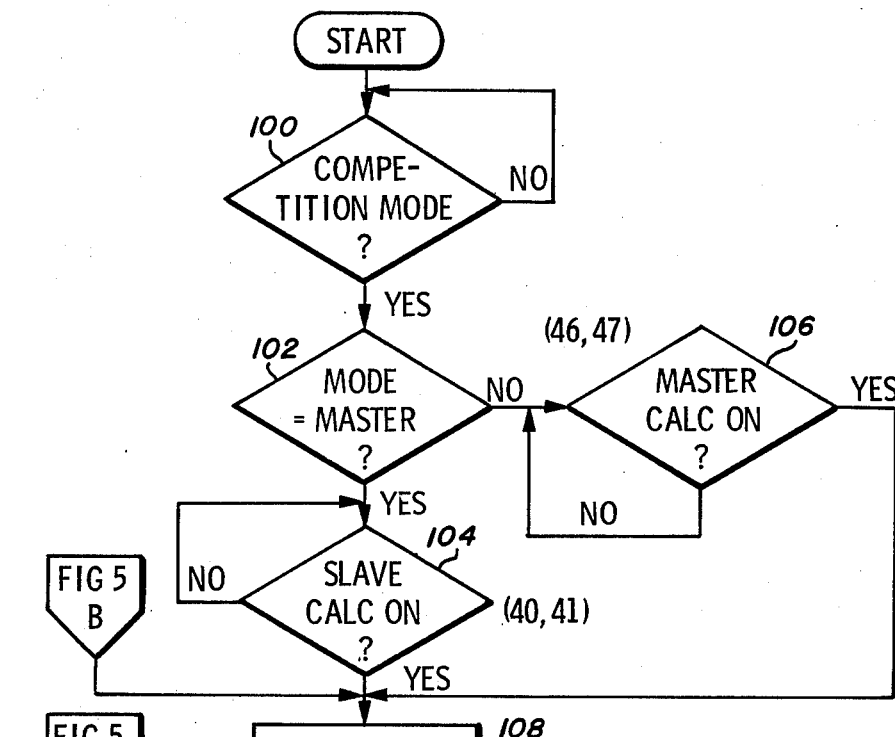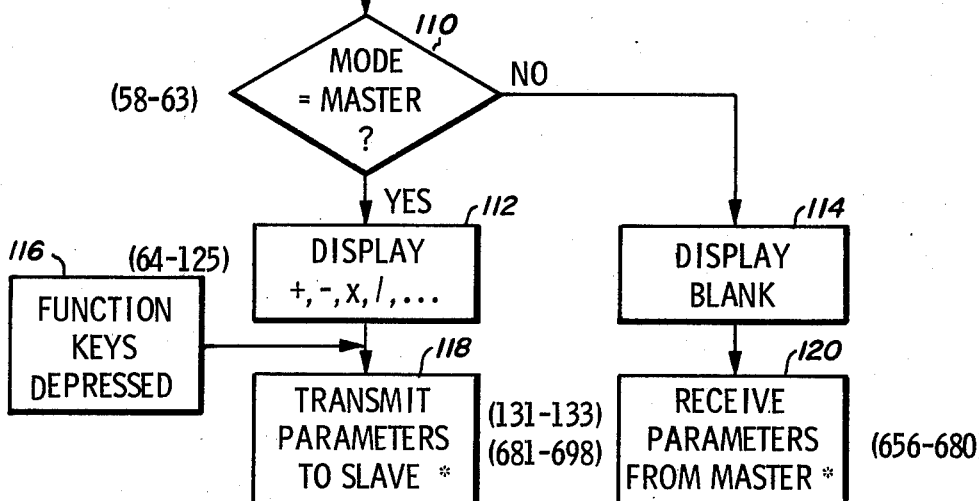
Fig_3

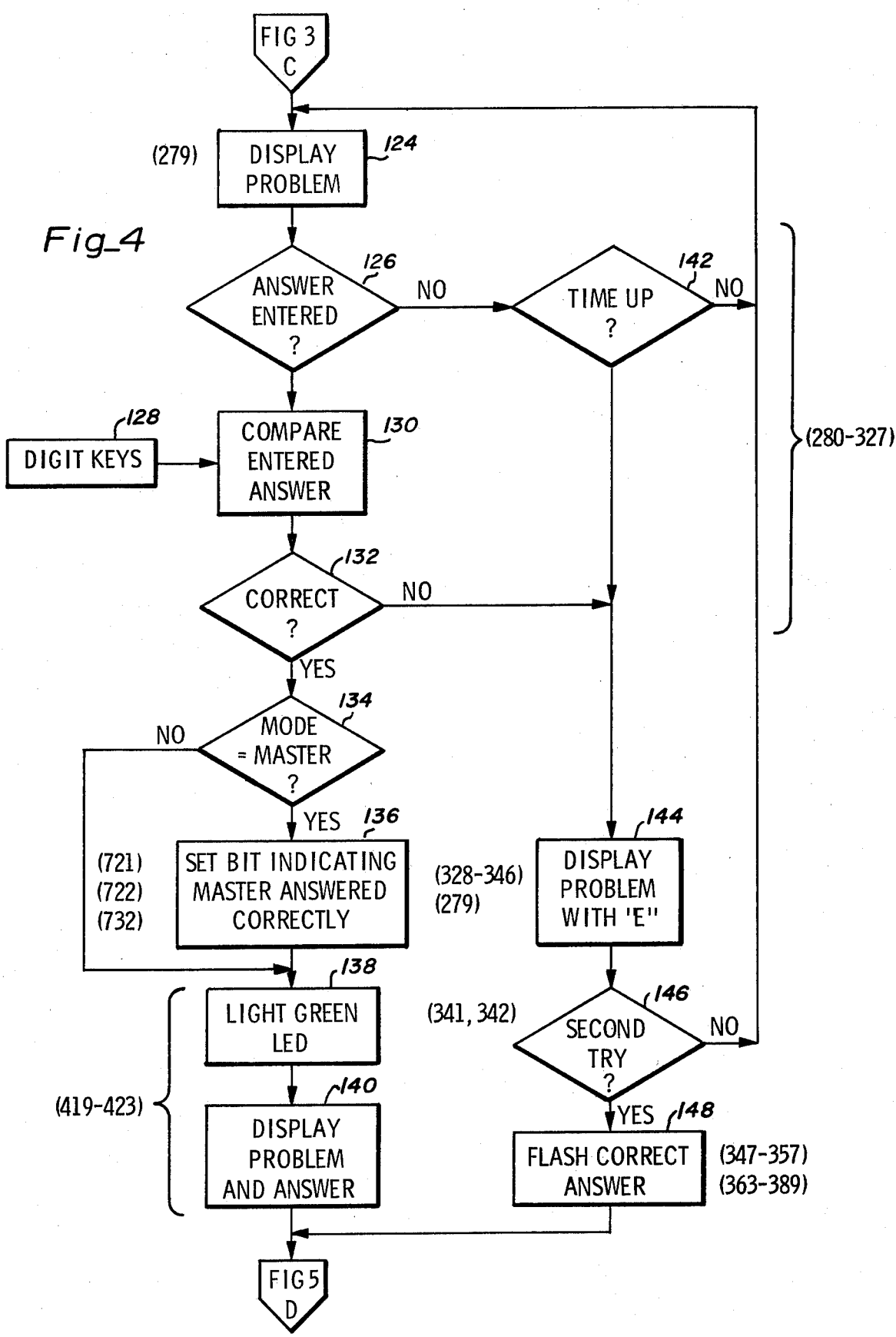

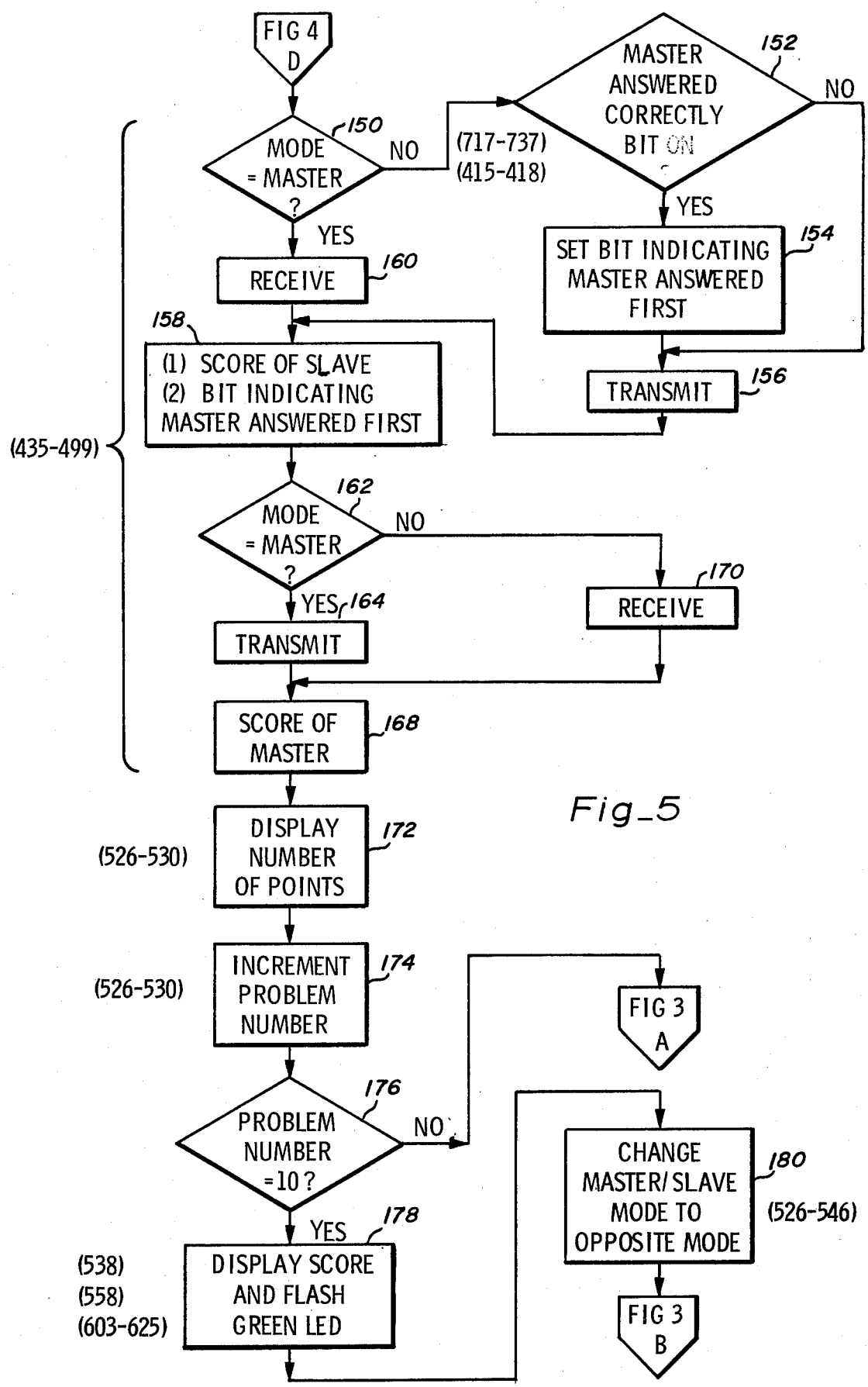
Fig_5

COMPETITIVE EDUCATIONAL CALCULATOR

BACKGROUND OF THE INVENTION

A. Field of the Invention

The invention relates to calculators and more particularly to educational calculators which present a problem to be solved without displaying the answer, thus allowing the user to insert a proposed answer, with means in the calculator for indicating whether or not the proposed answer is correct.

B. Description of the Prior Art

Prior educational calculators utilized a problem generator which generates a problem to be solved by the user. The problem is displayed without displaying the answer. The user solves a problem mentally and inserts the proposed answer. The calculator then compares the results arrived at by the calculator with the proposed answer entered by the user and turns on an indicator if the result is correct.

U.S. Pat. Nos. to E. N. Adams, 3,371,321, T. Nakajima, et al., 3,787,988, and Meyer, et al., 3,584,398, are examples of the current state of the art in electronic educational calculators. None of these patents disclose calculators that can be utilized in a competition mode whereby two users can compete with one another for educational purposes.

SUMMARY OF THE INVENTION

It is a paramount object of the present invention to provide a simple and economical means for enabling two educational calculators to operate in a competition mode whereby the users of the calculators can compete with one another in solving problems generates within the calculators.

Another object of the present invention is to provide a simple means for activating one of two competing calculators as a master, while the other calculator is a slave. Still another object of this invention is to provide a means for loosely coupling two processors, such that one processor is designated as the master and the other processor is designated as the slave whereby data and control information can be transferred between the calculators such that both calculators process the transferred data simultaneously.

Briefly, the invention includes a calculator having a display, manually operable input keys, and master/slave means for causing the calculator to operate as a master or a slave depending upon whether or not the master/slave means is energized. The calculator can communicate with a second identical calculator by a pluggable cable which connects the two calculators together. There is a plug at either end of the cable, but only one of the plugs is able to activate the master/slave means in one of the calculators. This automatically designates one calculator as the master and the other calculator as the slave.

Control means are provided in the calculator for generating parameters describing a problem to be solved. The control means is activated only in the calculator designated as the master. The master calculator then displays a problem derived from the generated parameters and transmits the parameters over the cable to the slave calculator. The slave calculator responds by displaying the same problem which it generates from the parameters transmitted to it from the master calculator. Since the master and slave calculators both display the same problem by means of their internal circuitry, the users of each calculator can compete with each other and against time in solving the problem by means of the input keys on their respective calculator's keyboard.

The invention has the advantage that each calculator can be manufactured and sold separately and can operate in a non-competition mode to solve problems generated internally by the calculator.

The invention has the further advantage that, by using an optional, inexpensive cable, two users of identical calculators can connect the two together and compete with one another in solving problems generated internally by the calculators. The competition mode is particularly advantageous in motivating young children by making a game out of the learning process.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 is a block diagram of two calculators connected together in accordance with the teachings of the present invention;

FIG. 2 is a more detailed block diagram of one of the calculators shown in FIG. 1; and FIGS. 3-5 are a flow chart of the micro-instructions necessary to enable the calculators to operate in a competition mode.

DESCRIPTION OF THE PREFERRED EMBODIMENT

Referring now to FIG. 1, there are shown two calculators 10 and 12 which are connected together by means of a cable shown within the dotted lines 26. The calculators include a display 14, 16, input keys for inserting digits and functions to be performed, and control logic 28, 30 for performing the various arithmetic and control functions necessary to enable the calculators to communicate with one another and to display problems and the answers thereto.

A master/slave connection 22, 24 is provided in each of the calculators. As will be subsequently described, the master/slave input activates logic within the calculator to cause the calculator to operate as a master or slave depending upon whether or not the input 22 or 24 is energized. A jumper 23 is provided in only one end of the cable 26 so that only one of the calculators has a voltage source (V) connected to the master/slave input 22 as shown in FIG. 1. The input 24 of calculator 12 is left unconnected to the voltage (V) and, therefore, the calculator 12 remains a slave and is not energized as a master. Within the control logic 28, there is means responsive to the input 22 for causing the calculator to generate parameters describing a problem to be solved. The problem is also displayed on the display 14. The master calculator 10 transmits the parameters to the slave calculator 12 by means of a line 27 which is connected to the out-terminal of calculator 10 and the in-terminal of calculator 12. Means in the control logic 30 of calculator 12 receive the parameters on the in-line and display the same problem which was generated by the master calculator on the display 16.

The users of each of the calculators 10 and 12 then attempt to answer the problem and enter a proposed answer by means of the input keys 18 and 20. Each calculator separately compares the entered answer with an internally-generated solution. If the answer was correct in the master calculator 10, a bit is set and is transmitted to the slave calculator 12 indicating that the master answered. If the slave calculator 12 answered correctly before the master calculator 10, then the fact that the master transmitted a bit indicating the master answered correctly is ignored.

Next, the score of the slave is transmitted to the master and the score of the master is transmitted to the slave. Both calculators then display the number of points scored on that problem. The problem-solving competition continues until a predetermined number of problems has been presented. The master/slave relationship is then automatically reversed and the user of the slave machine selects the type of problems to be solved.

Referring now to FIG. 2, one of the calculators 10 shown in FIG. 1 is disclosed in more detail.

The calculator is made up of an input keyboard 18, a display 14, a read-only memory (ROM) 30, an arithmetic logic unit (ALU) 32, a random access memory (RAM) 34, input/output control 36, and digit drivers 38. The ROM 30 contains 1,536 eight-bit words which are read by the ALU 32 and are interpreted as instructions. The instruction set is listed in Appendix I and includes instructions which can access bits in the RAM 34, add bits together, receive bits from outside the calculator and send bits outside the calculator.

Data is entered into the calculator by means of the keyboard 18. The keyboard has digit keys 0–9 and function keys +, −, x and /. Slow and fast buttons are provided which change the length of time the user has to answer a problem. Other buttons such as "amateur/pro" select easy or hard addition and subtraction problems. The buttons "algebra/table" cause the calculator to either present algebraic type problems which differ randomly or problems selected from a table such that one randomly selected factor within the problem remains the same while the other factor is incremented by 1 to produce table-type problems, i.e., 3 × 1, 3 × 2, 3 × 3, . . .

PROBLEM GENERATOR

When the calculator is first turned on, it begins displaying the four functions, +, −, x and /, repetitively in display position 40. This is a special seven-segment LED display capable of displaying these special symbols. The calculator continues displaying these symbols until the user presses one of the appropriate buttons on the keyboard 18 selecting one of the functions represented by the four symbols. When he does so, the corresponding symbol will light up for a short period of time on the display, if in stand-alone mode. After the symbol lights up, an arithmetic problem appears which is generated randomly by means of the control logic 36. Within the RAM 34 is a three-position binary-coded decimal (BCD) counter. This counter is incremented by 71 each time the display has been scanned once. The counter thus steps as follows: 0, 71, 142, 213, . . . When a fourth digit appears in the counter, it is dropped off. After 1,000 scans of the display, the counter arrives back at 0 having gone through all 1,000 of its possible states. The three digits from the counter are used to make up the terms of the problem. For example, if the counter registers 340, then a 3 will appear in position 39 of the display, and a 4 will appear in position 42 of the display. The digits generated always created a valid problem which has a one- or two-digit answer. The problem is not generated until after the user presses a function key. The state of the counter is thus dependent upon the time it takes the user to press a key, since the longer this takes the more times the display is scanned and, hence, the more units the counter is incremented.

DISPLAY TIMING

After the problem appears on the display, the user has approximately 6 seconds in which to answer the problem. This time as well as all other timed display functions are timed with a display counter which is located in the RAM 34. The display counter is a 12-bit binary counter. When the ROM micro-program reaches a point at which display timing is necessary, the counter is set to some predetermined value. The counter is then incremented by one after each scan of the display. When the counter returns to 0, the display is turned off. Therefore, the lower the predetermined value put into the counter initially, the longer the display will last. Thus, it can be seen that various functions, such as the time to answer a problem (slow/fast mode or first-/second try) can be easily changed by merely changing the predetermined value set into the counter under micro-program control.

STAND-ALONE MODE OF OPERATION

Once the user sees the problem being displayed, the proposed answer can be entered. As soon as the answer is entered, the ALU 32 compares the entered answer with the correct answer calculated internally but not displayed. If the proposed answer is correct, the green LED 44 is turned on, indicating to the user that the answer was correct. If the user enters the wrong answer, an "E" appears in the display in place of the answer. The user is given a second try to enter the correct answer. If on the second try the proposed answer is correct, the green LED 44 is lighted; if wrong, an E again appears in place of the answer. The correct answer is then displayed and flashes on and off a predetermined number of times. If on either the first or the second try, the user fails to enter an answer before a predetermined time (such as six seconds), the E is displayed.

After this first problem has been completed, a new problem of the same type appears and the user again attempts to answer the problem. This continues until 10 problems have been presented. At this point, the number of problems the user answered correctly appears in the last two positions of the display, and the green LED 44 is flashed on and off. The calculator then returns to displaying the four functions, +, −, x and /, and the user can start a new set of 10 problems.

COMPETITION MODE OF OPERATION

As described previously with respect to FIG. 1, two identical calculators can be connected together by means of a simple three-wire cable. As discussed previously, one of the calculators, such as calculator 10, is energized by means of a jumper 23 within the plug of the cable to designate this calculator as a master. The other calculator is then designated as a slave, since no jumper wire is provided within the plug at the other end of the cable. The competition mode of operation will be described with reference to the flow chart of FIGS. 3, 4 and 5. Some of the operations shown on this flow chart are performed by micro-code, stored within the ROM 30 (FIG. 2), and some of the operations are performed by hardware within the control logic 36 and the ALU 32. A complete micro-code listing is provided in Appendix II. The correspondence between the block diagrams in the flow chart and the micro-code listing is provided by means of the numbers within parentheses opposite the respective flow chart blocks to which the micro-code instructions correspond.

The mnemonic notation used in the micro-code listing corresponds to the standard instruction set utilized on the MM 5799 calculator-oriented processor marketed by National Semiconductor Corporation of Santa Clara, California, which is incorporated herein by reference.

Referring now to FIG. 3, at the start of the operation, both calculators must be turned on. At block 100 each calculator tests its plug connection (C) to insure that the plug has been inserted, thus indicating that the calculator is in the competition mode. At block 102, each calculator tests the M/S line 22 to see if a voltage (V) appears thereon by means of jumper 23 in FIG. 1. If yes, then the calculator is designated as "master". If no, then the calculator is designated as "slave". The master calculator then tests to see if the slave calculator has been turned on, block 104, and the slave calculator tests in block 106 to see if the master calculator has been turned on. If yes, the flow proceeds. A problem number counter, block 108, is provided to maintain a count of the number of problems which have been worked. At block 110, a test is made to see if the calculator is a "master". If yes, the master calculator begins displaying the function symbols, +, −, x and /, as previously described in the stand-alone mode of operation (block 112). The slave, at block 114, has a blank display.

The user of the master calculator selects the type of problem to be solved as in the stand-alone mode by depressing the appropriate function keys, block 116. The symbol he selects does not appear on the display. Instead, the master calculator transmits parameters to the slave, block 118, and the slave receives these parameters, block 120, from the master. These parameters include three digits comprising the problem generated from the random counter. If the table button on the keyboard 18 of FIG. 2 was pressed, then the table digit is also transmitted. Further, a digit describing the mode (algebra/normal or random/table) is also transmitted, along with the type of problems selected by the user of the master calculator.

Both calculators then generate the problem to be worked from the parameters at block 122.

Referring now to FIG. 44, both calculators display the same problem at block 124. The user at each calculator then answers the problem as was done in the stand-alone mode. If an answer is entered, block 126, the internally calculated answer is compared with the digit keys 128 at block 130. If the answer is correct, block 132, and the mode is master, block 134, then a bit is set at block 136, indicating that the user of the master calculator answered the problem correctly. A green LED is turned on at block 138, and at block 140 the problem and the answer are displayed.

Returning again to block 126, if no answer is entered, then a predetermined time is timed at block 142. If the time is up before an answer is entered or if an incorrect answer is entered as designated by block 132, then the calculator displays the problem with an E to indicate that the answer is incorrect (block 144). The user is given a second try at block 146 in which to answer the problem. On the second try, if the answer is still incorrect, the correct answer is flashed by means of block 148 and the flow proceeds to FIG. 5.

Referring now to FIG. 5, a test is made at block 150 to determine if the calculator is a master or a slave. If the calculator is a slave calculator, then a check is made to see if the master calculator answered the problem correctly by means of testing to see if the bit turned on in block 136 of FIG. 4 is on. If yes, then a bit is set in the slave calculator, indicating that the master answered first (block 154). The slave calculator then transmits the score of the slave and a bit indicating that the master answered first (blocks 156 and 158). As illustrated by block 160, the master calculator receives the information transmitted by the slave as illustrated by block 158.

At block 162, a test is again made to determine if the calculator is a master or a slave. If the calculator is a master, then the master transmits the score of the master to the slave, as illustrated by blocks 164 and 168. These bits are received by the slave, as illustrated by block 170.

After completing a problem, each user's display goes blank until the other user has finished working the problem. Then the number of points the user made is displayed, preceded by a + sign (block 172). A user will receive 0 points if the problem was answered wrong the first time, 1 point if the problem was answered correctly the first time but the other user answered correctly first, and 2 points if the user answered correctly the first time and answered before the other user.

After the number of points is displayed, the calculator increments the problem number (block 174). A test is made to determine if the problem number is equal to 10 at block 176. If not, the flow returns to FIG. 3 and a new problem can be selected by the master calculator. If, on the other hand, the problem number is equal to 10, 10 problems have been worked and the final score is displayed at block 178 and the green LED is flashed a number of times. At this point, the master/slave relationship is changed and the slave calculator begins displaying the functions, +, −, x and /. The calculator previously designated as master now becomes the slave and it is the other user's turn to select the type of problems to be worked. After the next 10-problem set has been worked, the master/slave relationship will again be reversed.

SUMMARY

What has been described is a method and apparatus for permitting two or more identical calculators to operate in competition mode whereby the users of the calculators may compete with each other and against time in solving problems presented by the calculators. Each calculator is provided with a display, manually-operable input keys, and with calculator logic for executing micro-program instructions stored within the calculator. A cable is provided for connecting the two calculators together. One end of the cable has a plug which energizes the calculator into which it is plugged as the master unit. The other end of the cable does not energize the other calculator, and this calculator becomes the slave.

The calculator designated as the master begins the competition by displaying various functions indicating addition, subtraction, multiplication, or division. The user of the master calculator selects the type of problem by depressing an appropriate function button. The master calculator generates parameters which describe a particular problem. These parameters are transmitted to the slave calculator over the cable, and the slave calculator displays the same problem being displayed by the master calculator. Both users mentally solve the problem and insert the answer by means of the keyboard. The user who answers correctly, and first, achieves the highest score. The score is transmitted to the other calculator and is displayed. After a predetermined number of problems has been worked, the final tally is displayed on both calculators and the master calculator now becomes the slave. A new set of problems is introduced by the user of the calculator now designated as master and the competition resumes.

While the invention has been particularly shown and described with reference to a preferred embodiment thereof, it will be understood by those skilled in the art that various changes in form and details may be made therein without departing from the spirit and scope of the invention.

APPENDIX I

MM5799
STANDARD INSTRUCTIONS

| | MNEMONIC | DATA FLOW | STATUS-SKIP IF | DESCRIPTION |
|---|---|---|---|---|
| Arithmetic Operations | AD | M + A → A | | Add M (B) to A, Store sum in A |
| | ADD | C + M + A → A | | Add carry bit to M(B). Add sum to A, store sum in A. |
| | | 1 → C if A ≥ 10 | A < 10 | Set C if A ≥ 10, reset C if A < 10. |
| | SUB | M + $\bar{A}$ + C → A | | Subtract A from M |
| | | Overflow → C | Overflow | Overflow to C |
| | COMP | $\bar{A}$ → A | | One's complement of A to A |
| | 0TA | 0 → A | | Clear Accumulator |
| | ADX (Y) | A + Y → A | No Overflow and Y ≠ 6 | Add constant (Y) to A. Store sum in A. Y = 1, 2 . . . . 15. |
| | HXA | H ↔ A | | Exchange contents of H register with A. |
| | TAM | | A = M (B) | Compare contents of A to M (B), skip if A = M (B) |
| | SC | 1 → C | | Set C register. |
| | RSC | 0 → C | | Reset C register |
| | TC | | C = 0 | Skip if C = 0 |
| Input/ Output | BTD | $B_d$ → $DO_4$ - $DO_1$ | | Transfer contents of $B_d$ to digit output latches |
| | DSPA | $A_4$ - $A_1$ → $S_a$ - $S_d$<br>H → $S_e$ - $S_g$<br>C → Sp | | $A_4$ - $A_1$ to output latches, directly to outputs $S_a$ - $S_d$. $H_3$-$H_1$ to output latches, direct to $S_e$ - $S_g$. C to Sp latch |
| | DSPS | A → $S_a$-$S_g$<br>C → Sp | | A to output latches, 7 segment decoded to $S_a$ - $S_g$. Segment decode is programmable. C to Sp latch |
| | AXO | SI → A<br>A → SO | | Exchange accumulator with serial input/output. |
| | LDF | 1 → F (N) | | N=1,2,3,4. Load F (N) from next instruction word. Two microcycle instruction. |
| | READ | $K_4$ - $K_1$ → A | | Read K inputs to A. Active state of input is programmable |
| Input Test | TIN | | INB = 1 | Test INB. Active state of input is programmable. |
| | TF (N) | TF-F4 = 1 | F (N) = 0 | N = 1, 2, 3. |
| | TKB | | K = 1 | Skip if any K input active. Read K inputs to A. Active state of input is programmable. |

MM5799
STANDARD INSTRUCTIONS

| | MNEMONIC | DATA FLOW | STATUS-SKIP IF | DESCRIPTION |
|---|---|---|---|---|
| Control Functions | GO TO (GO) | $I_6 - I_1 \rightarrow P_W$<br>If $P_P = 1111$ X: $11110 \rightarrow P_P$ | | Load next ROM instruction address.<br>If on page $36_8$ or $37_8$ reset page address to $36_8$. Note 2. |
| | CALL | $I_6 - I_1 \rightarrow P_W$, $11111 \rightarrow P_P$<br>If $P_P \neq 1111$X: SA $\rightarrow$ SB, P+1 $\rightarrow$ SA | | Call subroutine. If not on page $36_8$ or $37_8$, push down address save registers. Set page address to $37_8$. |
| | RET | SA $\rightarrow$ P<br>SB $\rightarrow$ SA, SB $\rightarrow$ SB | | Pop up ROM address save registers. |
| | RETS | SA $\rightarrow$ P<br>SB $\rightarrow$ SA, SB $\rightarrow$ SB | SKIP | RET, then skip next instruction upon return. |
| | LG/GO | Load P | | Two microcycle operation. Long GO TO, Load $P_P$ and $P_W$. Note 2. |
| | LG/CALL | SA $\rightarrow$ SB, P + 1 $\rightarrow$ SA<br>Load P | | Two microcycle operation. Long call. Load $P_P$ and $P_W$. Push down address save registers. Note 2. |
| | NOP | | | No operation. |

NOTE 2: ROM addresses $20_8$ through $27_8$ cannot be used.

| | MNEMONIC | DATA FLOW | STATUS-SKIP IF | DESCRIPTION |
|---|---|---|---|---|
| Memory Digit Operations | EXC (r) | A $\leftrightarrow$ M(B)<br>$B_r \oplus r \rightarrow B_r$ | | Exchange data word at M(B) with A. Exclusive-or $B_r$ with r. r = 0, 1, 2, 3. |
| | EXC-(r) | A $\leftrightarrow$ M(B)<br>$B_r \oplus r \rightarrow B_r$, $B_d - 1 \rightarrow B_d$ | $B_d \rightarrow 15$ | Exchange and decrement $B_d$. Exclusive-or $B_r$ with r. r = 0, 1, 2, 3. |
| | EXC + (r) | A $\leftrightarrow$ M(B)<br>$B_r \oplus r \rightarrow B_r$, $B_d + 1 \rightarrow B_d$ | $B_d \rightarrow 0$ or $B_d \rightarrow 13$ | Exchange and increment $B_d$. Exclusive-or $B_r$ with r. r = 0, 1, 2, 3. |
| | MTA (r) | M(B) $\rightarrow$ A<br>$B_r \oplus r \rightarrow B_r$ | | Load accumulator with data word M(B). Exclusive or $B_r$ with r. r = 0, 1, 2, 3. |
| | LM (Y) | Y $\rightarrow$ M(B)<br>$B_d + 1 \rightarrow B_d$ | | Load memory with Y. Y=0, 1, 2, . . . . . . .15. Increment $B_d$. |
| Memory Bit Operations | SM (Z) | 1 $\rightarrow$ M(B,Z) | | Set bit Z of M(B), Z = 1, 2, 4, 8. |
| | RSM (Z) | 0 $\rightarrow$ M (B,Z) | | Reset Bit Z of M(B). |
| | TM (Z) | | M (B,Z) = 0 | Test bit Z of M(B), skip if Zero. |
| Memory Address Operations | LB (r,d) | r $\rightarrow$ $B_r$, d $\rightarrow$ $B_d$ | | r = 0,1,2,3. d = 0 or 11, 12, 13, 14, 15. Load B register. Successive LB's are ignored. See Note 1. |
| | LBL (I) | $I_{7-5} \rightarrow B_r$, $I_{4-1} \rightarrow B_d$ | | Two microcycle instruction. Load next ROM word into B register. |
| | ATB | A $\rightarrow$ $B_d$ | | Transfer contents of accumulator to $B_d$ register. |
| | BTA | $B_d \rightarrow$ A | | Transfer contents of $B_d$ register to accumulator. |
| | HXBR | H $\leftrightarrow$ $B_r$ | | Exchange contents of H and $B_r$ registers. |

NOTE 1: d = 4 or 11, 12, 13, 14, 15 when RAM is configured 8 x 12 x 4.

APPENDIX II

```
 1*            CODE                    PAGE     0
 2*   0000    000    0000    POW       NOP
 3*   0040    017    0001              LB       0,15
 4*   0020    060    0002    ZP1       OTA
 5*   0010    040    0003              COMP
 6*   0004    243    0004              CALL     EX-
 7*   0002    320    0005              GO       ZP1
 8*   0041    261    0006              CALL     NR
 9*   0060    320    0007              GO       ZP1
10*   0030    017    0010              LB       0,15
11*   0014    060    0011    ZPT       OTA
12*   0006    040    0012              COMP
13*   0043    062    0013              TAM
14*   0021    321    0014    ERR       GO       ERR
15*   0050    243    0015              CALL     EX-
16*   0024    314    0016              GO       ZPT
17*   0012    201    0017              CALL     NR
18*   0045    314    0020              GO       ZPT
19*   0062    017    0021              LB       0,15
20*   0071    060    0022    Z1        OTA
21*   0074    243    0023              CALL     EX-
22*   0036    371    0024              GO       Z1
23*   0057    261    0025              CALL     NR
24*   0027    371    0026              GO       Z1
25*   0013    017    0027              LB       0,15
26*   0005    060    0030    ZT        OTA
27*   0042    062    0031              TAM
28*   0061    321    0032              GO       ERR
29*   0070    243    0033              CALL     EX-
30*   0034    305    0034              GO       ZT
31*   0016    261    0035              CALL     NR
32*   0047    305    0036              GO       ZT
33*   0023    024    0037              TF       2
34*   0011    322    0040              GO       SETM/S
35*   0044    346    0041    S1        GO       START1
36*   0022    034    0042    SETM/S    LB       1,12
37*   0051    041    0043              AXO
38*   0064    121    0044              ADX      1
39*   0032    367    0045              GO       SETMAS
40*   0055    145    0046              LG       25
41*   0066    267    0047              CALL     ADGISM
42*   0073    257    0050              CALL     LB3,7
43*   0035    116    0051              SM       2
44*   0056    346    0052              GO       START1
45*   0067    117    0053    SETMAS    SM       4
46*   0033    145    0054              LG       25
47*   0015    236    0055              CALL     ADGISS
48*   0046    220    0056    START1    CALL     PLANKD
49*   0063    207    0057              CALL     ZERR
50*   0031    053    0060              LB       E,11
51*   0054    110    0061              RSM      1
52*   0026    114    0062              RSM      2
53*   0053    072    0063              LB       5,5
54*   0025    100    0064              LM       0
55*   0052    024    0065              TF       2
56*   0065    375    0066              GO       MORS?
57*   0072    377    0067              GO       SGN++
58*   0075    034    0070    MORS?     LB       1,12
59*   0076    106    0071              TM       4
60*   0077    157    0072    SGN++     LG       1
61*   0037    300    0073              GO       SGN+
62*   0017    145    0074              LG       24
63*   0007    100    0075              GO       SLVWAT
```

| | | | | | | |
|---|---|---|---|---|---|---|
| 64* | | CODE | | | PAGE | 1 |
| 65* | 0100 | 033 | 0100 | SGN+ | LB | 1,11 |
| 66* | 0140 | 175 | 0101 | | LM | 13 |
| 67* | 0120 | 265 | 0102 | | CALL | ZERTIM |
| 68* | 0110 | 233 | 0103 | SETTIM | CALL | TIMEA |
| 69* | 0104 | 202 | 0104 | DSPSYM | CALL | DSPLAY |
| 70* | 0102 | 304 | 0105 | | GO | NXTSYM |
| 71* | 0141 | 157 | 0106 | | LG | 1 |
| 72* | 0160 | 252 | 0107 | | CALL | DECOD3 |
| 73* | 0130 | 156 | 0110 | | LG | 2 |
| 74* | 0114 | 100 | 0111 | | GO | OPER |
| 75* | 0106 | 154 | 0112 | | LG | 6 |
| 76* | 0143 | 001 | 0113 | | CALL | DECODE |
| 77* | 0121 | 311 | 0114 | | GO | NUMBR1 |
| 78* | 0150 | 142 | 0115 | | LG | 32 |
| 79* | 0124 | 032 | 0116 | | CALL | DECOD2 |
| 80* | 0112 | 374 | 0117 | | GO | ALGTAB |
| 81* | 0145 | 147 | 0120 | | LG | 21 |
| 82* | 0162 | 256 | 0121 | | CALL | BPSF |
| 83* | 0171 | 304 | 0122 | | GO | DSPSYM |
| 84* | 0174 | 073 | 0123 | ALGTAB | LB | 3,11 |
| 85* | 0136 | 106 | 0124 | | TM | 4 |
| 86* | 0157 | 316 | 0125 | | GO | ALGBRA |
| 87* | 0127 | 053 | 0126 | | LB | 2,11 |
| 88* | 0113 | 116 | 0127 | | SM | 2 |
| 89* | 0105 | 055 | 0130 | | LB | 2,13 |
| 90* | 0142 | 006 | 0131 | | MTA | |
| 91* | 0161 | 054 | 0132 | | LB | 2,12 |
| 92* | 0170 | 007 | 0133 | | EXC | |
| 93* | 0134 | 304 | 0134 | | GO | DSPSYM |
| 94* | 0110 | 053 | 0135 | ALGBRA | LB | 2,11 |
| 95* | 0147 | 111 | 0136 | | SM | 1 |
| 96* | 0123 | 304 | 0137 | | GO | DSPSYM |
| 97* | 0111 | 054 | 0140 | NUMBR1 | LB | 2,12 |
| 98* | 0144 | 010 | 0141 | | EXC- | |
| 99* | 0122 | 116 | 0142 | | SM | 2 |
| 100* | 0151 | 304 | 0143 | | GO | DSPSYM |
| 101* | 0164 | 033 | 0144 | NXTSYM | LB | 1,11 |
| 102* | 0132 | 104 | 0145 | | TM | 1 |
| 103* | 0155 | 363 | 0146 | | GO | +/ |
| 104* | 0160 | 107 | 0147 | | TM | 2 |
| 105* | 0173 | 333 | 0150 | | GO | 2 |
| 106* | 0135 | 033 | 0151 | | LB | 1,11 |
| 107* | 0156 | 161 | 0152 | | LM | 1 |
| 108* | 0167 | 310 | 0153 | | GO | SETTIM |
| 109* | 0133 | 033 | 0154 | - | LB | 1,11 |
| 110* | 0115 | 164 | 0155 | | LM | 4 |
| 111* | 0146 | 310 | 0156 | | GO | SETTIM |
| 112* | 0163 | 106 | 0157 | +/ | TM | 4 |
| 113* | 0131 | 326 | 0160 | | GO | + |
| 114* | 0154 | 300 | 0161 | | GO | SGN+ |
| 115* | 0126 | 033 | 0162 | + | LB | 1,11 |
| 116* | 0153 | 176 | 0163 | | LM | 14 |
| 117* | 0125 | 310 | 0164 | | GO | SETTIM |
| 118* | 0152 | 107 | 0165 | DECOD3 | TM | 6 |
| 119* | 0165 | 375 | 0166 | | GO | TABLE? |
| 120* | 0172 | 101 | 0167 | | RETS | |
| 121* | 0175 | 074 | 0170 | TABLE? | LB | 3,12 |
| 122* | 0176 | 006 | 0171 | | MTA | |
| 123* | 0177 | 135 | 0172 | | ADX | 13 |
| 124* | 0137 | 100 | 0173 | | RET | |
| 125* | 0117 | 101 | 0174 | | RETS | |
| 126* | | CODE | | | PAGE | 2 |
| 127* | 0200 | 074 | 0200 | OPER | LB | 3,12 |
| 128* | 0240 | 006 | 0201 | | MTA | |
| 129* | 0220 | 236 | 0202 | | CALL | LB2,10 |
| 130* | 0210 | 007 | 0203 | | EXC | |
| 131* | 0204 | 024 | 0204 | | TF | 2 |
| 132* | 0202 | 145 | 0205 | | LG | 24 |
| 133* | 0241 | 105 | 0206 | | GO | IPFMTS |
| 134* | 0260 | 236 | 0207 | | CALL | LB2,10 |
| 135* | 0230 | 060 | 0210 | | OTA | |
| 136* | 0214 | 104 | 0211 | | TM | 1 |
| 137* | 0206 | 324 | 0212 | | GO | SBDV |
| 138* | 0243 | 105 | 0213 | | TM | 2 |

| | | | | | |
|---|---|---|---|---|---|
| 139* | 0221 | 134 | 0214 | ADX | 12 |
| 140* | 0250 | 123 | 0215 | ADX | 3 |
| 141* | 0224 | 105 | 0216 | SBDV TM | 2 |
| 142* | 0212 | 121 | 0217 | ADX | 1 |
| 143* | 0245 | 136 | 0220 | ADX | 14 |
| 144* | 0262 | 000 | 0221 | NOP | |
| 145* | 0271 | 033 | 0222 | LB | 1,11 |
| 146* | 0274 | 007 | 0223 | EXC | |
| 147* | 0230 | 072 | 0224 | LB | 3,5 |
| 148* | 0257 | 161 | 0225 | LM | 1 |
| 149* | 0227 | 265 | 0226 | CALL | ZERTIM |
| 150* | 0213 | 263 | 0227 | CALL | TIMED |
| 151* | 0205 | 202 | 0230 | CALL | DSPLAY |
| 152* | 0242 | 212 | 0231 | NXTPRB CALL | HOLD |
| 153* | 0261 | 141 | 0232 | NXTPR1 LG 35 | |
| 154* | 0270 | 257 | 0233 | CALL | ZERDSP |
| 155* | 0234 | 034 | 0234 | LB | 1,12 |
| 156* | 0216 | 111 | 0235 | SM | 1 |
| 157* | 0247 | 003 | 0236 | SC | |
| 158* | 0223 | 227 | 0237 | CALL | LB3,8 |
| 159* | 0211 | 200 | 0240 | CALL | ADD1 |
| 160* | 0244 | 156 | 0241 | LG 3 | |
| 161* | 0222 | 300 | 0242 | GO | TBL? |
| 162* | 0251 | 257 | 0243 | HOLD1 CALL | LB3,7 |
| 163* | 0264 | 106 | 0244 | TM | 4 |
| 164* | 0232 | 100 | 0245 | RET | |
| 165* | 0255 | 017 | 0246 | LB | 0,15 |
| 166* | 0260 | 060 | 0247 | UTA | |
| 167* | 0273 | 061 | 0250 | HXA | |
| 168* | 0235 | 060 | 0251 | UTA | |
| 169* | 0256 | 121 | 0252 | A+1 ADX | 1 |
| 170* | 0267 | 315 | 0253 | GO | AOVER |
| 171* | 0233 | 356 | 0254 | GO | A+1 |
| 172* | 0215 | 061 | 0255 | AOVER HXA | |
| 173* | 0246 | 121 | 0256 | ADX | 1 |
| 174* | 0263 | 326 | 0257 | GO | MOVER |
| 175* | 0231 | 061 | 0260 | HXA | |
| 176* | 0254 | 356 | 0261 | GO | A+1 |
| 177* | 0226 | 007 | 0262 | MOVER EXC | |
| 178* | 0253 | 121 | 0263 | ADX | 1 |
| 179* | 0225 | 372 | 0264 | GO | EXRT |
| 180* | 0252 | 007 | 0265 | EXC | |
| 181* | 0265 | 356 | 0266 | GO | A+1 |
| 182* | 0272 | 007 | 0267 | EXRT EXC | |
| 183* | 0275 | 100 | 0270 | RET | |
| 184* | | CODE | | PAGE | 3 |
| 185* | 0300 | 053 | 0300 | TBL? LB | 2,11 |
| 186* | 0340 | 105 | 0301 | TM | 2 |
| 187* | 0320 | 315 | 0302 | GO | TABLE |
| 188* | 0310 | 141 | 0303 | LG 34 | |
| 189* | 0304 | 036 | 0304 | CALL | XFER |
| 190* | 0302 | 236 | 0305 | CALL | LB2,10 |
| 191* | 0341 | 106 | 0306 | TM | 4 |
| 192* | 0360 | 312 | 0307 | GO | X=+ |
| 193* | 0330 | 205 | 0310 | CALL | MLTPLY |
| 194* | 0314 | 256 | 0311 | DIV CALL | SWAPAC |
| 195* | 0300 | 033 | 0312 | LB | 1,11 |
| 196* | 0343 | 161 | 0313 | LM | 1 |
| 197* | 0321 | 145 | 0314 | LG 24 | |
| 198* | 0350 | 046 | 0315 | CALL | M15#0 |
| 199* | 0324 | 377 | 0316 | GO | DSPLY |
| 200* | 0312 | 105 | 0317 | X=+ TM | 2 |
| 201* | 0345 | 351 | 0320 | GO | ++ |
| 202* | 0362 | 104 | 0321 | TM | 4 |
| 203* | 0371 | 373 | 0322 | GO | A- |
| 204* | 0374 | 205 | 0323 | XX CALL | MLTPLY |
| 205* | 0336 | 053 | 0324 | LB | 2,11 |
| 206* | 0357 | 106 | 0325 | TM | 4 |
| 207* | 0327 | 273 | 0326 | CALL | SWAPAB |
| 208* | 0313 | 141 | 0327 | LG 34 | |
| 209* | 0305 | 045 | 0330 | CALL | NORML? |
| 210* | 0342 | 377 | 0331 | GO | DSPLY |
| 211* | 0361 | 141 | 0332 | LG 35 | |
| 212* | 0370 | 247 | 0333 | CALL | A0? |
| 213* | 0334 | 377 | 0334 | GO | DSPLY |

| | | | | | | |
|---|---|---|---|---|---|---|
| 214* | 0316 | 273 | 0335 | | CALL | SWAPAB |
| 215* | 0347 | 141 | 0336 | | LG 35 | |
| 216* | 0323 | 247 | 0337 | | CALL | AQ? |
| 217* | 0311 | 377 | 0340 | | GO | DSPLY |
| 218* | 0344 | 161 | 0341 | | LM | I |
| 219* | 0322 | 377 | 0342 | | GO | DSPLY |
| 220* | 0351 | 053 | 0343 | ++ | LB | 2,11 |
| 221* | 0364 | 106 | 0344 | | TM | 4 |
| 222* | 0332 | 273 | 0345 | | CALL | SWAPAB |
| 223* | 0355 | 247 | 0346 | CALSUM | CALL | PLUS |
| 224* | 0366 | 377 | 0347 | | GO | DSPLY |
| 225* | 0373 | 247 | 0350 | -- | CALL | PLUS |
| 226* | 0335 | 256 | 0351 | MNS | CALL | SWAPAC |
| 227* | 0356 | 053 | 0352 | | LB | 1,11 |
| 228* | 0367 | 176 | 0353 | | LM | 14 |
| 229* | 0333 | 377 | 0354 | | GO | DSPLY |
| 230* | 0315 | 144 | 0355 | TABLE | LG 26 | |
| 231* | 0340 | 015 | 0356 | | CALL | TBLDGT |
| 232* | 0363 | 236 | 0357 | | CALL | LB2,10 |
| 233* | 0331 | 106 | 0360 | | TM | 4 |
| 234* | 0354 | 352 | 0361 | | GO | X=+X=+ |
| 235* | 0326 | 205 | 0362 | /// | CALL | MLTPLY |
| 236* | 0353 | 273 | 0363 | | CALL | SWAPAB |
| 237* | 0325 | 314 | 0364 | | GO | DIV |
| 238* | 0352 | 105 | 0365 | X=+X=+ | TM | 2 |
| 239* | 0365 | 317 | 0366 | | GO | +++ |
| 240* | 0372 | 104 | 0367 | | TM | 1 |
| 241* | 0375 | 307 | 0370 | | GO | --- |
| 242* | 0376 | 205 | 0371 | XXX | CALL | MLTPLY |
| 243* | 0377 | 155 | 0372 | DSPLY | LG 4 | |
| 244* | 0337 | 100 | 0373 | | GO | DISPLY |
| 245* | 0317 | 355 | 0374 | +++ | GO | CALSUM |
| 246* | 0307 | 247 | 0375 | --- | CALL | PLUS |
| 247* | 0303 | 273 | 0376 | | CALL | SWAPAB |
| 248* | 0301 | 335 | 0377 | | GO | MNS |
| 249* | | CODE | | | PAGE | 4 |
| 250* | 0400 | 141 | 0400 | DISPLY | LG 34 | |
| 251* | 0440 | 045 | 0401 | | CALL | NORML? |
| 252* | 0420 | 321 | 0402 | | GO | ANC |
| 253* | 0410 | 236 | 0403 | | CALL | LB2,10 |
| 254* | 0404 | 104 | 0404 | | TM | 1 |
| 255* | 0402 | 314 | 0405 | | GO | ANA |
| 256* | 0441 | 141 | 0406 | AND | LG 35 | |
| 257* | 0460 | 250 | 0407 | | CALL | ANSB |
| 258* | 0430 | 324 | 0410 | | GO | BLKALL |
| 259* | 0414 | 141 | 0411 | ANA | LG 35 | |
| 260* | 0406 | 241 | 0412 | | CALL | ANSA |
| 261* | 0443 | 324 | 0413 | | GO | BLKALL |
| 262* | 0421 | 141 | 0414 | ANC | LG 35 | |
| 263* | 0450 | 236 | 0415 | | CALL | ANSC |
| 264* | 0424 | 250 | 0416 | BLKALL | CALL | GET |
| 265* | 0412 | 012 | 0417 | | LB | 0,5 |
| 266* | 0445 | 001 | 0420 | | MXBR | |
| 267* | 0462 | 204 | 0421 | | CALL | BLNKD |
| 268* | 0471 | 053 | 0422 | | LB | 2,11 |
| 269* | 0474 | 102 | 0423 | | RSM | 0 |
| 270* | 0436 | 034 | 0424 | | LB | 1,12 |
| 271* | 0457 | 114 | 0425 | | RSM | 2 |
| 272* | 0427 | 257 | 0426 | | CALL | LB3,7 |
| 273* | 0413 | 114 | 0427 | | RSM | 2 |
| 274* | 0405 | 072 | 0430 | TRY2 | LB | 3,5 |
| 275* | 0442 | 160 | 0431 | | LM | 0 |
| 276* | 0461 | 265 | 0432 | | CALL | ZERTIM |
| 277* | 0470 | 215 | 0433 | | CALL | TIMEB |
| 278* | 0434 | 225 | 0434 | DSPA | CALL | ZBLK |
| 279* | 0416 | 202 | 0435 | DSPB | CALL | DSPLAY |
| 280* | 0447 | 155 | 0436 | | LG 5 | |
| 281* | 0423 | 342 | 0437 | | GO | WRONG |
| 282* | 0411 | 157 | 0440 | | LG 1 | |
| 283* | 0444 | 252 | 0441 | | CALL | DECOD3 |
| 284* | 0422 | 316 | 0442 | | GO | DSPB |
| 285* | 0451 | 154 | 0443 | | LG 6 | |
| 286* | 0464 | 061 | 0444 | | CALL | DECODE |
| 287* | 0432 | 333 | 0445 | | GO | NUMBR2 |

| | | | | | |
|---|---|---|---|---|---|
| 288* | 0455 | 142 | 0446 | | LG 32 |
| 289* | 0460 | 032 | 0447 | | CALL DECOD2 |
| 290* | 0473 | 316 | 0450 | | GO USPB |
| 291* | 0435 | 147 | 0451 | | LG 21 |
| 292* | 0456 | 256 | 0452 | | CALL HPSF |
| 293* | 0467 | 316 | 0453 | | GO USPB |
| 294* | 0433 | 015 | 0454 | NUMBR2 | LB 5,13 |
| 295* | 0415 | 011 | 0455 | | EXC+ |
| 296* | 0446 | 124 | 0456 | | ADX 4 |
| 297* | 0463 | 160 | 0457 | | LM 0 |
| 298* | 0431 | 134 | 0460 | | ADX 12 |
| 299* | 0454 | 007 | 0461 | | EXC |
| 300* | 0426 | 155 | 0462 | | LG 5 |
| 301* | 0453 | 300 | 0463 | | GO PUTANS |
| 302* | | CODE | | | PAGE 5 |
| 303* | 0500 | 250 | 0500 | PUTANS | CALL GET |
| 304* | 0540 | 015 | 0501 | | LB 0,13 |
| 305* | 0520 | 006 | 0502 | | MTA |
| 306* | 0510 | 012 | 0503 | | LB 0,5 |
| 307* | 0504 | 211 | 0504 | | CALL PUT |
| 308* | 0502 | 250 | 0505 | | CALL GET |
| 309* | 0541 | 016 | 0506 | | LB 0,14 |
| 310* | 0560 | 006 | 0507 | | MTA |
| 311* | 0530 | 262 | 0510 | | CALL LB0,6 |
| 312* | 0514 | 211 | 0511 | | CALL PUT |
| 313* | 0506 | 225 | 0512 | | CALL ZBLK |
| 314* | 0543 | 015 | 0513 | | LB 0,13 |
| 315* | 0521 | 026 | 0514 | | MTA 1 |
| 316* | 0550 | 062 | 0515 | | TAM |
| 317* | 0524 | 357 | 0516 | | GO WRNG? |
| 318* | 0512 | 016 | 0517 | | LB 0,14 |
| 319* | 0545 | 026 | 0520 | | MTA 1 |
| 320* | 0562 | 062 | 0521 | | TAM |
| 321* | 0571 | 357 | 0522 | | GO WRNG? |
| 322* | 0574 | 154 | 0523 | | LG 7 |
| 323* | 0536 | 300 | 0524 | | GO RIGHT |
| 324* | 0557 | 036 | 0525 | WRNG? | LB 1,14 |
| 325* | 0527 | 060 | 0526 | | OTA |
| 326* | 0513 | 062 | 0527 | | TAM |
| 327* | 0505 | 372 | 0530 | | GO 2DGTS? |
| 328* | 0542 | 072 | 0531 | WRUNG | LB 3,5 |
| 329* | 0561 | 161 | 0532 | | LM 1 |
| 330* | 0570 | 265 | 0533 | | CALL ZERTIM |
| 331* | 0534 | 233 | 0534 | | CALL TIMEA |
| 332* | 0516 | 202 | 0535 | | CALL DSPLAY |
| 333* | 0547 | 257 | 0536 | | CALL LB3,7 |
| 334* | 0523 | 110 | 0537 | | RSM 1 |
| 335* | 0511 | 250 | 0540 | | CALL GET |
| 336* | 0544 | 012 | 0541 | | LB 0,5 |
| 337* | 0522 | 001 | 0542 | | MXBR |
| 338* | 0551 | 174 | 0543 | | LM 12 |
| 339* | 0564 | 177 | 0544 | | LM 15 |
| 340* | 0532 | 034 | 0545 | | LB 1,12 |
| 341* | 0555 | 105 | 0546 | | TM 2 |
| 342* | 0560 | 333 | 0547 | | GO TRY2DN |
| 343* | 0573 | 116 | 0550 | | SM 2 |
| 344* | 0535 | 237 | 0551 | | CALL ZERNTR |
| 345* | 0556 | 155 | 0552 | | LG 4 |
| 346* | 0567 | 105 | 0553 | | GO TRY2 |
| 347* | 0533 | 265 | 0554 | TRY2DN | CALL ZERTIM |
| 348* | 0515 | 263 | 0555 | | CALL TIMED |
| 349* | 0546 | 225 | 0556 | | CALL ZBLK |
| 350* | 0563 | 072 | 0557 | | LB 3,5 |
| 351* | 0531 | 161 | 0560 | | LM 1 |
| 352* | 0554 | 202 | 0561 | | CALL DSPLAY |
| 353* | 0520 | 017 | 0562 | | LB 0,15 |
| 354* | 0553 | 060 | 0563 | | OTA |
| 355* | 0525 | 007 | 0564 | | EXC |
| 356* | 0552 | 154 | 0565 | | LG 6 |
| 357* | 0565 | 100 | 0566 | | GO FLSH |
| 358* | 0572 | 016 | 0567 | 2DGTS? | LB 0,14 |
| 359* | 0575 | 062 | 0570 | | TAM |
| 360* | 0576 | 342 | 0571 | | GO WRUNG |
| 361* | 0577 | 155 | 0572 | | LG 4 |
| 362* | 0537 | 134 | 0573 | | GO USPA |

```
363*            CODE                    PAGE    6
364*    0600 250  0600   FLSH   CALL    GET
365*    0040 035  0601          LB      1,13
366*    0020 006  0602          MTA
367*    0610 012  0603          LB      0,5
368*    0004 211  0604          CALL    PUT
369*    0502 250  0605          CALL    GET
370*    0041 036  0606          LB      1,14
371*    0660 006  0607          MTA
372*    0030 262  0610          CALL    LB0,6
373*    0514 211  0611          CALL    PUT
374*    0000 225  0612          CALL    ZBLK
375*    0643 246  0613          CALL    TIMEC
376*    0021 202  0614          CALL    DSPLAY
377*    0650 250  0615          CALL    GET
378*    0024 012  0616          LB      0,5
379*    0612 001  0617          HXBR
380*    0045 204  0620          CALL    BLNKD
381*    0662 246  0621          CALL    TIMEC
382*    0071 202  0622          CALL    DSPLAY
383*    0674 017  0623          LB      0,15
384*    0036 003  0624          SC
385*    0057 200  0625          CALL    ADD1
386*    0627 115  0626          TC
387*    0013 154  0627          LG      7
388*    0005 312  0630          GO      XRSCR?
389*    0642 300  0631          GO      FLSH
390*    0061 074  0632   DECODE LB      3,12
391*    0670 006  0633          MTA
392*    0034 132  0634          ADX     10
393*    0516 346  0635          GO      0?
394*    0047 123  0636          ADX     3
395*    0623 344  0637          GO      NUM
396*    0011 101  0640          RETS
397*    0644 006  0641   NUM    MTA
398*    0022 022  0642          AD
399*    0651 022  0643          AD
400*    0064 040  0644          COMP
401*    0632 073  0645          LB      3,11
402*    0055 121  0646          ADX     1
403*    0066 000  0647          NOP
404*    0673 106  0650          TM      4
405*    0035 121  0651          ADX     1
406*    0056 105  0652          TM      2
407*    0667 121  0653          ADX     1
408*    0033 000  0654          NOP
409*    0515 100  0655          RET
410*    0046 073  0656   0?     LB      3,11
411*    0663 060  0657          UTA
412*    0631 106  0660          TM      4
413*    0054 100  0661          RET
414*    0520 101  0662          RETS
415*            CODE                    PAGE    7
416*    0700 024  0700   RIGHT  TF      2
417*    0740 145  0701          LG      25
418*    0120 200  0702          CALL    WHO1?
419*    0710 072  0703   SET3,5 LB      3,5
420*    0704 165  0704          LM      5
421*    0702 265  0705          CALL    ZERTIM
422*    0741 263  0706          CALL    TIMED
423*    0760 202  0707          CALL    DSPLAY
424*    0730 034  0710          LB      1,12
425*    0714 105  0711          TM      2
426*    0706 312  0712          GO      ARSCR?
427*    0743 213  0713          CALL    LB3,9
428*    0721 003  0714          SC
429*    0750 200  0715          CALL    ADD1
430*    0724 200  0716          CALL    ADD1
431*    0712 024  0717   XRSCR? TF      2
432*    0745 374  0720          GO      XRSCUR
433*    0762 147  0721          LG      21
434*    0771 300  0722          GO      DONE?
435*    0774 034  0723   XRSCUR LB      1,12
436*    0736 106  0724          TM      4
437*    0757 147  0725          LG      20
```

| | | | | | |
|---|---|---|---|---|---|
| 438* | 0727 | 100 | 0726 | | GO STDP |
| 439* | 0713 | 145 | 0727 | | LG 25 |
| 440* | 0705 | 236 | 0730 | | CALL ADGISS |
| 441* | 0742 | 053 | 0731 | | LB 2,11 |
| 442* | 0761 | 226 | 0732 | | CALL XMIDGT |
| 443* | 0170 | 213 | 0733 | | CALL LB3,9 |
| 444* | 0734 | 226 | 0734 | | CALL XMIDGT |
| 445* | 0710 | 023 | 0735 | | LBL |
| 446* | 0747 | 072 | 0736 | | 3,10 |
| 447* | 0123 | 226 | 0737 | | CALL XMTDGT |
| 448* | 0711 | 214 | 0740 | | CALL DSPFF1 |
| 449* | 0744 | 044 | 0741 | WTO | TF 3 |
| 450* | 0722 | 344 | 0742 | | GO WTO |
| 451* | 0751 | 264 | 0743 | | CALL RCVDGT |
| 452* | 0164 | 035 | 0744 | | LB 1,13 |
| 453* | 0732 | 007 | 0745 | | EXC |
| 454* | 0755 | 264 | 0746 | | CALL RCVDGT |
| 455* | 0760 | 036 | 0747 | | LB 1,14 |
| 456* | 0773 | 007 | 0750 | | EXC |
| 457* | 0135 | 257 | 0751 | | CALL LB3,7 |
| 458* | 0756 | 116 | 0752 | | SM 2 |
| 459* | 0767 | 147 | 0753 | | LG 20 |
| 460* | 0733 | 155 | 0754 | | GO DSP+ |
| 461* | | CODE | | | PAGE 20 |
| 462* | 2000 | 145 | 2000 | STDP | LG 25 |
| 463* | 2040 | 267 | 2001 | | CALL ADGISM |
| 464* | 2020 | 264 | 2002 | | CALL RCVDGT |
| 465* | 2010 | 130 | 2003 | | ADX 0 |
| 466* | 2004 | 000 | 2004 | | NOP |
| 467* | 2002 | 053 | 2005 | | LB 2,11 |
| 468* | 2041 | 007 | 2006 | | EXC |
| 469* | 2060 | 107 | 2007 | | TM 8 |
| 470* | 2030 | 306 | 2010 | | GO ADD1? |
| 471* | 2014 | 362 | 2011 | | GO RSSCR |
| 472* | 2006 | 043 | 2012 | ADD1? | RSC |
| 473* | 2043 | 257 | 2013 | | CALL LB3,7 |
| 474* | 2021 | 104 | 2014 | | TM 1 |
| 475* | 2050 | 003 | 2015 | | SC |
| 476* | 2024 | 213 | 2016 | | CALL LB3,9 |
| 477* | 2012 | 200 | 2017 | | CALL ADD1 |
| 478* | 2045 | 200 | 2020 | | CALL ADD1 |
| 479* | 2062 | 264 | 2021 | RSSCR | CALL RCVDGT |
| 480* | 2071 | 035 | 2022 | | LB 1,13 |
| 481* | 2074 | 007 | 2023 | | EXC |
| 482* | 2036 | 264 | 2024 | | CALL RCVDGT |
| 483* | 2057 | 036 | 2025 | | LB 1,14 |
| 484* | 2027 | 007 | 2026 | | EXC |
| 485* | 2013 | 044 | 2027 | WT1 | TF 3 |
| 486* | 2005 | 301 | 2030 | | GO XMS |
| 487* | 2042 | 313 | 2031 | | GO WT1 |
| 488* | 2061 | 260 | 2032 | XMS | CALL DSPFF0 |
| 489* | 2070 | 060 | 2033 | | DTA |
| 490* | 2034 | 121 | 2034 | WTSG0 | ADX 1 |
| 491* | 2010 | 323 | 2035 | | GO XMSCR |
| 492* | 2047 | 334 | 2036 | | GO WTSG0 |
| 493* | 2023 | 213 | 2037 | XMSCR | CALL LB3,9 |
| 494* | 2011 | 226 | 2040 | | CALL XMTDGT |
| 495* | 2044 | 023 | 2041 | | LBL |
| 496* | 2022 | 072 | 2042 | | 3,10 |
| 497* | 2051 | 226 | 2043 | | CALL XMTDGT |
| 498* | 2064 | 257 | 2044 | | CALL LB3,7 |
| 499* | 2032 | 114 | 2045 | | RSM 2 |
| 500* | 2055 | 220 | 2046 | DSP+ | CALL BLANKD |
| 501* | 2066 | 033 | 2047 | | LB 1,11 |
| 502* | 2073 | 175 | 2050 | | LM 13 |
| 503* | 2035 | 257 | 2051 | | CALL LB3,7 |
| 504* | 2050 | 104 | 2052 | | TM 1 |
| 505* | 2067 | 303 | 2053 | | GO DSP+12 |
| 506* | 2033 | 032 | 2054 | | LB 1,5 |
| 507* | 2015 | 160 | 2055 | | LM 0 |
| 508* | 2046 | 372 | 2056 | | GO DSP++ |
| 509* | 2063 | 053 | 2057 | DSP+12 | LB 2,11 |
| 510* | 2031 | 107 | 2060 | | TM 8 |
| 511* | 2054 | 352 | 2061 | | GO DSP+2 |
| 512* | 2026 | 032 | 2062 | | LB 1,5 |

```
513*  2053  161  2063            LM              1
514*  2025  372  2064            GO              DSP++
515*  2052  032  2065   DSP+2    LB              1,5
516*  2065  162  2066            LM              2
517*  2072  212  2067   DSP++    CALL            HOLD
518*  2075  225  2070            CALL            ZBLK
519*  2076  263  2071            CALL            TIMED
520*  2077  202  2072            CALL            DSPLAY
521*  2037  147  2073            LG       21
522*  2017  300  2074            GO              DONE?
523*  2007  034  2075   OFF==    LB              1,12
524*  2003  110  2076            RSM             1
525*  2001  100  2077            RET
526*        CODE                 PAGE            21
527*  2100  227  2100   DONE?    CALL            LB3,8
528*  2140  060  2101            OTA
529*  2120  062  2102            TAM
530*  2110  311  2103            GO              NXTPLM
531*  2104  012  2104   RGHT     LB              0,5
532*  2102  177  2105            LM              15
533*  2141  220  2106            CALL            BLANKD
534*  2160  024  2107            TF              2
535*  2130  343  2110            GO              DSPM/Y
536*  2114  146  2111            LG       22
537*  2106  100  2112            GO              R/P
538*  2143  033  2113   DSPM/Y   LB              1,11
539*  2121  177  2114            LM              15
540*  2150  213  2115            CALL            CB3,9
541*  2124  006  2116            MTA
542*  2112  012  2117            LB              0,5
543*  2145  007  2120            EXC
544*  2162  023  2121            LBL
545*  2171  072  2122                            3,10
546*  2174  006  2123            MTA
547*  2136  202  2124            CALL            LB0,6
548*  2157  007  2125            EXC
549*  2127  035  2126            LB              1,13
550*  2113  006  2127            MTA
551*  2105  052  2130            LB              2,5
552*  2142  007  2131            EXC
553*  2161  036  2132            LB              1,14
554*  2170  006  2133            MTA
555*  2134  274  2134            CALL            LB2,6
556*  2116  007  2135            EXC
557*  2147  146  2136            LG       22
558*  2123  143  2137            GO              FLASH
559*  2111  024  2140   NXTPLM   TF              2
560*  2144  364  2141            GO              MNPSW
561*  2122  156  2142            LG       2
562*  2151  142  2143            GO              NXTPRB
563*  2164  034  2144   MNPSW    LB              1,12
564*  2132  106  2145            TM              4
565*  2155  145  2146   NXPRB    LG       24
566*  2166  105  2147            GO              IPFMTS
567*  2173  145  2150            LG       24
568*  2135  100  2151            GO              SLVWAT
569*  2156  074  2152   UPSF     LB              3,12
570*  2167  106  2153            TM              4
571*  2133  372  2154            GO              SF?
572*  2115  073  2155            LB              3,11
573*  2146  104  2156            TM              1
574*  2163  325  2157            GO              AMTR
575*  2131  105  2160            TM              2
576*  2154  034  2161            LB              1,12
577*  2120  112  2162            SM              0
578*  2153  100  2163            RET
579*  2125  034  2164   AMTR     LB              1,12
580*  2152  102  2165            RSM             0
581*  2165  100  2166            RET
582*  2172  073  2167   SF?      LB              3,11
583*  2175  104  2170            TM              1
584*  2176  307  2171            GO              SLOW
585*  2177  257  2172            CALL            LB3,7
586*  2137  112  2173            SM              7
587*  2117  100  2174            RET
```

| | | | | | | |
|---|---|---|---|---|---|---|
| 588* | 2107 | 257 | 2175 | SLOW | CALL | LB3,7 |
| 589* | 2103 | 102 | 2176 | | RSM | 0 |
| 590* | 2101 | 100 | 2177 | | RET | |
| 591* | | CODE | | | PAGE | 22 |
| 592* | 2200 | 213 | 2200 | R/P | CALL | LB3,9 |
| 593* | 2240 | 006 | 2201 | | MTA | |
| 594* | 2220 | 012 | 2202 | | LB | 0,5 |
| 595* | 2210 | 007 | 2203 | | EXC | |
| 596* | 2204 | 023 | 2204 | | LBL | |
| 597* | 2202 | 072 | 2205 | | | 3,10 |
| 598* | 2241 | 006 | 2206 | | MTA | |
| 599* | 2260 | 262 | 2207 | | CALL | LB0,6 |
| 600* | 2230 | 007 | 2210 | | EXC | |
| 601* | 2214 | 033 | 2211 | | LB | 1,11 |
| 602* | 2206 | 177 | 2212 | | LM | 15 |
| 603* | 2243 | 060 | 2213 | FLASH | OTA | |
| 604* | 2221 | 017 | 2214 | | LB | 0,15 |
| 605* | 2250 | 007 | 2215 | | EXC | |
| 606* | 2624 | 212 | 2216 | | CALL | HOLD |
| 607* | 2212 | 225 | 2217 | | CALL | ZBLK |
| 608* | 2245 | 072 | 2220 | /ON | LB | 3,5 |
| 609* | 2262 | 161 | 2221 | | LM | 1 |
| 610* | 2271 | 265 | 2222 | | CALL | ZERTIM |
| 611* | 2274 | 246 | 2223 | | CALL | TIMEC |
| 612* | 2230 | 202 | 2224 | | CALL | DSPLAY |
| 613* | 2257 | 072 | 2225 | | LB | 3,5 |
| 614* | 2227 | 165 | 2226 | | LM | 5 |
| 615* | 2213 | 246 | 2227 | | CALL | TIMEC |
| 616* | 2205 | 202 | 2230 | | CALL | DSPLAY |
| 617* | 2242 | 017 | 2231 | | LB | 0,15 |
| 618* | 2261 | 003 | 2232 | | SC | |
| 619* | 2270 | 060 | 2233 | | OTA | |
| 620* | 2234 | 040 | 2234 | | COMP | |
| 621* | 2216 | 042 | 2235 | | SUB | |
| 622* | 2247 | 007 | 2236 | | EXC | |
| 623* | 2623 | 115 | 2237 | | TC | |
| 624* | 2211 | 322 | 2240 | | GO | RVSDIR |
| 625* | 2244 | 345 | 2241 | | GO | /ON |
| 626* | 2272 | 024 | 2242 | RVSDIR | TF | 2 |
| 627* | 2251 | 332 | 2243 | | GO | REVERS |
| 628* | 2264 | 352 | 2244 | | GO | STRT1 |
| 629* | 2232 | 034 | 2245 | REVERS | LB | 1,12 |
| 630* | 2255 | 106 | 2246 | | TM | 4 |
| 631* | 2266 | 363 | 2247 | | GO | REVMSR |
| 632* | 2273 | 117 | 2250 | | SM | 0 |
| 633* | 2235 | 257 | 2251 | | CALL | LB3,7 |
| 634* | 2256 | 114 | 2252 | | RSM | 2 |
| 635* | 2267 | 260 | 2253 | | CALL | DSPFF0 |
| 636* | 2233 | 044 | 2254 | WAIT1E | TF | 3 |
| 637* | 2215 | 352 | 2255 | | GO | STRT1 |
| 638* | 2240 | 353 | 2256 | | GO | WAIT1E |
| 639* | 2263 | 113 | 2257 | REVMSR | RSM | 4 |
| 640* | 2231 | 257 | 2260 | | CALL | LB3,7 |
| 641* | 2254 | 116 | 2261 | | SM | 2 |
| 642* | 2226 | 044 | 2262 | WAIT0E | TF | 3 |
| 643* | 2253 | 326 | 2263 | | GO | WAIT0E |
| 644* | 2225 | 214 | 2264 | | CALL | DSPFF1 |
| 645* | 2252 | 157 | 2265 | STRT1 | LG | 0 |
| 646* | 2265 | 146 | 2266 | | GO | START1 |
| 647* | 2272 | 061 | 2267 | LSBRIT | HXA | |
| 648* | 2275 | 060 | 2270 | | OTA | |
| 649* | 2276 | 040 | 2271 | | COMP | |
| 650* | 2277 | 021 | 2272 | | DSPS | 1 |
| 651* | 2237 | 061 | 2273 | | HXA | |
| 652* | 2217 | 100 | 2274 | | RET | |
| 653* | 2207 | 075 | 2275 | ZTIMER | LB | 3,13 |
| 654* | 2203 | 201 | 2276 | | CALL | ZER3 |
| 655* | 2201 | 100 | 2277 | | RET | |
| 656* | | CODE | | | PAGE | 24 |
| 657* | 2400 | 204 | 2400 | SLVWAT | CALL | RCVDGT |
| 658* | 2440 | 057 | 2401 | | LB | 5,15 |
| 659* | 2420 | 007 | 2402 | | EXC | |
| 660* | 2410 | 204 | 2403 | | CALL | RCVDGT |
| 661* | 2404 | 056 | 2404 | | LB | 2,14 |
| 662* | 2402 | 007 | 2405 | | EXC | |

| | | | | | | |
|---|---|---|---|---|---|---|
|663*|2441|264|2406| |CALL|RCVDGT|
|664*|2460|055|2407| |LB|2,13|
|665*|2430|007|2410| |EXC| |
|666*|2414|264|2411| |CALL|RCVDGT|
|667*|2400|054|2412| |LB|2,12|
|668*|2443|007|2413| |EXC| |
|669*|2421|264|2414| |CALL|RCVDGT|
|670*|2450|053|2415| |LB|2,11|
|671*|2424|007|2416| |EXC| |
|672*|2412|264|2417| |CALL|RCVDGT|
|673*|2445|236|2420| |CALL|LB2,10|
|674*|2462|007|2421| |EXC| |
|675*|2471|060|2422| |OTA| |
|676*|2474|121|2423|WAIT1|ADX|1|
|677*|2430|327|2424| |GO|DSO|
|678*|2457|374|2425| |GO|WAIT1|
|679*|2427|260|2426|DSO|CALL|USPFF0|
|680*|2413|355|2427| |GO|SETPRM|
|681*|2405|057|2430|TPFMTS|LB|2,15|
|682*|2442|226|2431| |CALL|XMTDGT|
|683*|2461|056|2432| |LB|2,14|
|684*|2470|226|2433| |CALL|XMTDGT|
|685*|2434|055|2434| |LB|2,13|
|686*|2416|226|2435| |CALL|XMTDGT|
|687*|2447|054|2436| |LB|2,12|
|688*|2423|226|2437| |CALL|XMTDGT|
|689*|2411|053|2440| |LB|2,11|
|690*|2444|226|2441| |CALL|XMTDGT|
|691*|2422|236|2442| |CALL|LB2,10|
|692*|2451|226|2443| |CALL|XMTDGT|
|693*|2464|044|2444|WAITOD|TF|3|
|694*|2432|364|2445| |GO|WAITOD|
|695*|2455|053|2446|SETPRM|LB|2,11|
|696*|2466|102|2447| |RSM|0|
|697*|2473|156|2450| |LG|2|
|698*|2435|161|2451| |GO|NXTPR1|
|699*|2456|257|2452|SETTST|CALL|LB3,7|
|700*|2467|117|2453| |SM|4|
|701*|2433|157|2454| |LG|0|
|702*|2415|146|2455| |GO|START1|
|703*|2446|032|2456|M15#0|LB|1,5|
|704*|2463|060|2457| |OTA| |
|705*|2431|062|2460| |TAM| |
|706*|2454|100|2461| |RET| |
|707*|2420|271|2462| |CALL|LB1,6|
|708*|2453|062|2463| |TAM| |
|709*|2425|100|2464| |RET| |
|710*|2452|012|2465| |LB|0,5|
|711*|2465|027|2466| |EXC|1|
|712*|2472|007|2467| |EXC| |
|713*|2475|062|2470| |TAM| |
|714*|2470|100|2471| |RET| |
|715*|2477|101|2472| |LM|1|
|716*|2437|100|2473| |RET| |
|717*| |CODE| | |PAGE|25|
|718*|2500|034|2500|WHO1?|LB|1,12|
|719*|2540|105|2501|MSTR1?|TM|2|
|720*|2520|374|2502| |GO|ST3,5|
|721*|2510|106|2503| |TM|4|
|722*|2504|324|2504| |GO|SDP|
|723*|2502|044|2505| |TF|3|
|724*|2541|362|2506| |GO|SET3,7|
|725*|2560|053|2507| |LB|2,11|
|726*|2530|112|2510| |SM|8|
|727*|2514|213|2511| |CALL|LB3,9|
|728*|2506|003|2512| |SC| |
|729*|2543|200|2513| |CALL|ADD1|
|730*|2521|200|2514| |CALL|ADD1|
|731*|2550|362|2515| |GO|SET3,7|
|732*|2524|214|2516|SDP|CALL|USPFF1|
|733*|2512|257|2517| |CALL|LB3,7|
|734*|2545|116|2520| |SM| |
|735*|2562|257|2521|SET3,7|CALL|LB3,7|
|736*|2571|111|2522| |SM|1|
|737*|2574|100|2523|ST3,5|RET| |

```
738*  2530  214  2524  ADGISS  CALL  DSPFF1
739*  2357  044  2525          TF    3
740*  2527  336  2526          GO    ADGISS
741*  2513  044  2527  W1      TF    3
742*  2305  361  2530          GO    W02
743*  2342  313  2531          GO    W1
744*  2361  044  2532  W02     TF    3
745*  2370  361  2533          GO    W02
746*  2334  044  2534  W12     TF    3
747*  2316  323  2535          GO    DSOTM
748*  2347  334  2536          GO    W12
749*  2523  260  2537  DSOTM   CALL  DSPFF0
750*  2511  060  2540          OTA
751*  2544  061  2541          HXA
752*  2522  060  2542          OTA
753*  2551  121  2543  DLAY    ADX   1
754*  2564  355  2544          GO    UVR
755*  2532  351  2545          GO    DLAY
756*  2555  061  2546  UVR     HXA
757*  2566  121  2547          ADX   1
758*  2573  100  2550          RET
759*  2535  061  2551          HXA
760*  2556  351  2552          GO    DLAY
761*  2367  044  2553  ADGISM  TF    3
762*  2533  346  2554          GO    CYCLE
763*  2515  307  2555          GO    ADGISM
764*  2546  260  2556  CYCLE   CALL  DSPFF0
765*  2563  060  2557          OTA
766*  2531  121  2560  OCYC    ADX   1
767*  2554  353  2561          GO    NOW1
768*  2520  331  2562          GO    OCYC
769*  2553  214  2563  NOW1    CALL  DSPFF1
770*  2525  060  2564          OTA
771*  2552  121  2565  1CYC    ADX   1
772*  2565  375  2566          GO    CKS≠0
773*  2572  352  2567          GO    1CYC
774*  2575  044  2570  CKS≠0   TF    3
775*  2576  346  2571          GO    CYCLE
776*  2577  100  2572          RET
777*  2537  010  2573  EXC=    EXC=
778*  2517  103  2574          BTA
779*  2507  133  2575          ADX   11
780*  2503  100  2576          RET
781*  2501  101  2577          RETS
782*        CODE              PAGE  26
783*  2600  043  2600  XMITA   RSC
784*  2640  060  2601          OTA
785*  2620  040  2602          COMP
786*  2610  021  2603          DSPS
787*  2604  104  2604  DISPA   TM    1
788*  2602  003  2605          SC
789*  2641  044  2606  WAITOA  TF    3
790*  2606  341  2607          GO    WAITOA
791*  2630  021  2610          DSPS
792*  2614  060  2611  DISPB   OTA
793*  2606  121  2612  WAT114  ADX   1
794*  2643  362  2613          GO    RSF3B
795*  2621  000  2614          NOP
796*  2650  000  2615          NOP
797*  2624  000  2616          NOP
798*  2612  000  2617          NOP
799*  2645  306  2620          GO    WAT114
800*  2662  003  2621  RSF3B   SC
801*  2671  040  2622          COMP
802*  2674  021  2623          DSPS
803*  2630  044  2624  WAIT1A  TF    3
804*  2657  100  2625          RET
805*  2627  336  2626          GO    WAIT1A
806*  2613  044  2627  RCVA    TF    3
807*  2605  361  2630          GO    RSF3A
808*  2642  313  2631          GO    RCVA
809*  2661  003  2632  RSF3A   SC
810*  2670  060  2633          OTA
811*  2634  040  2634          COMP
812*  2616  021  2635          DSPS
```

| | | | | | |
|---|---|---|---|---|---|
| 813* | 2047 | 060 | 2636 | DISPC | OTA |
| 814* | 2623 | 123 | 2637 | WAIT2 | ADX 3 |
| 815* | 2011 | 332 | 2640 | | GO NOCHNG |
| 816* | 2644 | 044 | 2641 | | TF 3 |
| 817* | 2022 | 323 | 2642 | | GO WAIT2 |
| 818* | 2051 | 112 | 2643 | | SM 8 |
| 819* | 2664 | 373 | 2644 | | GO SF3A |
| 820* | 2632 | 102 | 2645 | NOCHNG | RSM 0 |
| 821* | 2055 | 044 | 2646 | WAITUB | TF 3 |
| 822* | 2060 | 355 | 2647 | | GO WAITUB |
| 823* | 2673 | 043 | 2650 | SF3A | RSC |
| 824* | 2035 | 060 | 2651 | | OTA |
| 825* | 2056 | 040 | 2652 | | COMP |
| 826* | 2667 | 021 | 2653 | | DSPS |
| 827* | 2033 | 100 | 2654 | DISPD | RET |
| 828* | 2615 | 054 | 2655 | TBLDGT | LB 2,12 |
| 829* | 2040 | 006 | 2656 | | MTA |
| 830* | 2063 | 052 | 2657 | | LB 2,5 |
| 831* | 2631 | 007 | 2660 | | EXC |
| 832* | 2054 | 060 | 2661 | | OTA |
| 833* | 2626 | 062 | 2662 | | TAM |
| 834* | 2053 | 305 | 2663 | | GO TBLNUM |
| 835* | 2625 | 011 | 2664 | | EXC+ |
| 836* | 2052 | 161 | 2665 | | LM 1 |
| 837* | 2665 | 227 | 2666 | TBLNUM | CALL LB3,8 |
| 838* | 2672 | 006 | 2667 | | MTA |
| 839* | 2075 | 032 | 2670 | | LB 1,5 |
| 840* | 2676 | 007 | 2671 | | EXC |
| 841* | 2077 | 060 | 2672 | | OTA |
| 842* | 2637 | 062 | 2673 | | TAM |
| 843* | 2017 | 100 | 2674 | | RET |
| 844* | 2607 | 011 | 2675 | | EXC+ |
| 845* | 2003 | 161 | 2676 | | LM 1 |
| 846* | 2001 | 100 | 2677 | | RET |
| 847* | | CODE | | | PAGE 27 |
| 848* | 2700 | 006 | 2700 | XMITDT | MTA |
| 849* | 2740 | 017 | 2701 | | LB 0,15 |
| 850* | 2720 | 007 | 2702 | | EXC |
| 851* | 2710 | 231 | 2703 | | CALL XMIT |
| 852* | 2704 | 110 | 2704 | | RSM 2 |
| 853* | 2702 | 105 | 2705 | | TM 1 |
| 854* | 2741 | 111 | 2706 | | SM 1 |
| 855* | 2760 | 231 | 2707 | | CALL XMIT |
| 856* | 2730 | 110 | 2710 | | RSM 4 |
| 857* | 2714 | 106 | 2711 | | TM 1 |
| 858* | 2700 | 111 | 2712 | | SM 1 |
| 859* | 2743 | 231 | 2713 | | CALL XMIT |
| 860* | 2721 | 110 | 2714 | | RSM 8 |
| 861* | 2750 | 107 | 2715 | | TM 1 |
| 862* | 2724 | 111 | 2716 | | SM 1 |
| 863* | 2712 | 231 | 2717 | | CALL XMIT |
| 864* | 2745 | 100 | 2720 | | RET |
| 865* | 2762 | 017 | 2721 | RCVDT | LB 0,15 |
| 866* | 2771 | 222 | 2722 | | CALL RCV |
| 867* | 2774 | 110 | 2723 | | RSM 2 |
| 868* | 2730 | 107 | 2724 | | TM 1 |
| 869* | 2757 | 111 | 2725 | | SM 1 |
| 870* | 2727 | 222 | 2726 | | CALL RCV |
| 871* | 2713 | 114 | 2727 | | RSM 2 |
| 872* | 2705 | 107 | 2730 | | TM 8 |
| 873* | 2742 | 116 | 2731 | | SM 2 |
| 874* | 2761 | 222 | 2732 | | CALL RCV |
| 875* | 2770 | 113 | 2733 | | RSM 8 |
| 876* | 2734 | 107 | 2734 | | TM 0 |
| 877* | 2716 | 117 | 2735 | | SM 4 |
| 878* | 2747 | 222 | 2736 | | CALL RCV |
| 879* | 2723 | 006 | 2737 | | MTA |
| 880* | 2711 | 100 | 2740 | DSPRCV | RET |
| 881* | 2744 | 012 | 2741 | DISPLA | LB 0,5 |
| 882* | 2722 | 255 | 2742 | | CALL SHFT |
| 883* | 2751 | 012 | 2743 | | LB 0,5 |
| 884* | 2764 | 255 | 2744 | | CALL SHFT |
| 885* | 2732 | 034 | 2745 | | LB 1,12 |
| 886* | 2755 | 104 | 2746 | | TM 1 |
| 887* | 2766 | 333 | 2747 | | GO NNMSN |

| | | | | | |
|---|---|---|---|---|---|
| 888* | 2173 | 023 | 2750 | | LBL |
| 889* | 2735 | 027 | 2751 | | 1,7 |
| 890* | 2156 | 177 | 2752 | | LM | 15
| 891* | 2167 | 363 | 2753 | | GO | SHF |
| 892* | 2733 | 023 | 2754 | ON=SN | LBL |
| 893* | 2115 | 027 | 2755 | | 1,7 |
| 894* | 2146 | 163 | 2756 | | LM | 5 |
| 895* | 2163 | 023 | 2757 | SHF | LBL |
| 896* | 2731 | 027 | 2760 | | 1,7 |
| 897* | 2154 | 255 | 2761 | | CALL | SHFT |
| 898* | 2120 | 032 | 2762 | | LB | 1,5 |
| 899* | 2753 | 255 | 2763 | | CALL | SHFT |
| 900* | 2125 | 271 | 2764 | | CALL | LB1,6 |
| 901* | 2752 | 255 | 2765 | | CALL | SHFT |
| 902* | 2165 | 033 | 2766 | | LB | 1,11 |
| 903* | 2772 | 255 | 2767 | | CALL | SHFT |
| 904* | 2175 | 052 | 2770 | | LB | 2,5 |
| 905* | 2776 | 255 | 2771 | | CALL | SHFT |
| 906* | 2177 | 274 | 2772 | | CALL | LB2,6 |
| 907* | 2737 | 255 | 2773 | | CALL | SHFT |
| 908* | 2117 | 072 | 2774 | DISP2 | LB | 3,5 |
| 909* | 2707 | 102 | 2775 | | RSM | 0 |
| 910* | 2703 | 143 | 2776 | | LG | 30 |
| 911* | 2701 | 100 | 2777 | | GO | DCSP |
| 912* | | CODE | | | PAGE | 30 |
| 913* | 3000 | 003 | 3000 | DCSP | SC |
| 914* | 3040 | 257 | 3001 | | CALL | LB3,7 |
| 915* | 3020 | 105 | 3002 | | TM | 2 |
| 916* | 3010 | 043 | 3003 | | RSC |
| 917* | 3004 | 014 | 3004 | STRDSP | LB | 0,12 |
| 918* | 3002 | 006 | 3005 | DSP3 | MTA |
| 919* | 3041 | 061 | 3006 | | HXA |
| 920* | 3060 | 103 | 3007 | | BTA |
| 921* | 3030 | 040 | 3010 | | COMP |
| 922* | 3014 | 134 | 3011 | | ADX | 12 |
| 923* | 3000 | 000 | 3012 | | NOP |
| 924* | 3043 | 120 | 3013 | | ATB |
| 925* | 3021 | 045 | 3014 | | BTD |
| 926* | 3050 | 061 | 3015 | | HXA |
| 927* | 3024 | 021 | 3016 | | DSPS |
| 928* | 3012 | 103 | 3017 | | BTA |
| 929* | 3045 | 025 | 3020 | KEY? | TKB |
| 930* | 3062 | 326 | 3021 | | GO | NOKEY |
| 931* | 3071 | 072 | 3022 | KEYDWN | LB | 3,5 |
| 932* | 3074 | 112 | 3023 | | SM | 0 |
| 933* | 3036 | 146 | 3024 | | LG | 22 |
| 934* | 3057 | 072 | 3025 | | CALL | LSBRIT |
| 935* | 3027 | 004 | 3026 | | TF | 1 |
| 936* | 3013 | 342 | 3027 | | GO | SAVKEY |
| 937* | 3005 | 326 | 3030 | | GO | NOKEY |
| 938* | 3042 | 074 | 3031 | SAVKEY | LB | 5,12 |
| 939* | 3061 | 007 | 3032 | | EXC |
| 940* | 3070 | 060 | 3033 | | OTA |
| 941* | 3034 | 121 | 3034 | VERKEY | ADX | 1 |
| 942* | 3016 | 364 | 3035 | | GO | KEYON |
| 943* | 3047 | 025 | 3036 | | TKB |
| 944* | 3023 | 344 | 3037 | | GO | RJCKEY |
| 945* | 3011 | 334 | 3040 | | GO | VERKEY |
| 946* | 3044 | 074 | 3041 | RJCKEY | LB | 5,12 |
| 947* | 3022 | 006 | 3042 | | MTA |
| 948* | 3051 | 326 | 3043 | | GO | NOKEY |
| 949* | 3064 | 064 | 3044 | KEYON | READ |
| 950* | 3032 | 073 | 3045 | INKEY | LB | 5,11 |
| 951* | 3055 | 007 | 3046 | | EXC |
| 952* | 3066 | 063 | 3047 | RLSKEY | CDF |
| 953* | 3073 | 075 | 3050 | | 3,13 |
| 954* | 3035 | 074 | 3051 | | LB | 5,12 |
| 955* | 3056 | 006 | 3052 | | MTA |
| 956* | 3067 | 136 | 3053 | | ADX | 14 |
| 957* | 3033 | 363 | 3054 | | GO | RET |
| 958* | 3015 | 145 | 3055 | | LG | 24 |
| 959* | 3046 | 156 | 3056 | | GO | SETTST |
| 960* | 3063 | 073 | 3057 | RET | LB | 3,11 |
| 961* | 3031 | 006 | 3060 | | MTA |
| 962* | 3054 | 101 | 3061 | | RETS |

| | | | | | |
|---|---|---|---|---|---|
| 963* | 3026 | 040 | 3062 | NOKEY | COMP |
| 964* | 3053 | 133 | 3063 | | ADX 11 |
| 965* | 3025 | 000 | 3064 | | NOP |
| 966* | 3052 | 061 | 3065 | | MXA |
| 967* | 3065 | 060 | 3066 | | OTA |
| 968* | 3072 | 040 | 3067 | | COMP |
| 969* | 3075 | 021 | 3070 | | DSPS 1 |
| 970* | 3076 | 061 | 3071 | | MXA |
| 971* | 3077 | 012 | 3072 | | LB 0,5 |
| 972* | 3037 | 120 | 3073 | | ATB |
| 973* | 3017 | 133 | 3074 | | ADX 11 |
| 974* | 3007 | 302 | 3075 | | GO DSP3 |
| 975* | 3003 | 143 | 3076 | | LG 31 |
| 976* | 3001 | 300 | 3077 | | GO NOKEY2 |
| 977* | | CODE | | | PAGE 31 |
| 978* | 3100 | 072 | 3100 | NOKEY2 | LB 3,5 |
| 979* | 3140 | 106 | 3101 | | TM 4 |
| 980* | 3120 | 045 | 3102 | | BTD |
| 981* | 3110 | 104 | 3103 | DSPLOC | TM 1 |
| 982* | 3104 | 314 | 3104 | | GO BLK8 |
| 983* | 3102 | 107 | 3105 | | TM 6 |
| 984* | 3141 | 314 | 3106 | | GO BLK8 |
| 985* | 3160 | 063 | 3107 | PRESKY | LDF |
| 986* | 3130 | 074 | 3110 | | LB 3,12 |
| 987* | 3114 | 055 | 3111 | BLK8 | LB 2,13 |
| 988* | 3106 | 003 | 3112 | | SC |
| 989* | 3143 | 060 | 3113 | | OTA |
| 990* | 3121 | 002 | 3114 | | ADD |
| 991* | 3150 | 126 | 3115 | | ADX • |
| 992* | 3124 | 011 | 3116 | | EXC+ |
| 993* | 3112 | 060 | 3117 | | OTA |
| 994* | 3145 | 127 | 3120 | | ADX / |
| 995* | 3162 | 000 | 3121 | | NOP |
| 996* | 3171 | 002 | 3122 | | ADD |
| 997* | 3174 | 126 | 3123 | | ADX • |
| 998* | 3136 | 011 | 3124 | | EXC+ |
| 999* | 3157 | 060 | 3125 | | OTA |
| 1000* | 3127 | 002 | 3126 | | ADD |
| 1001* | 3113 | 126 | 3127 | | ADX • |
| 1002* | 3105 | 007 | 3130 | | EXC |
| 1003* | 3142 | 055 | 3131 | | LB 2,13 |
| 1004* | 3161 | 060 | 3132 | | OTA |
| 1005* | 3170 | 062 | 3133 | FFB? | TAM |
| 1006* | 3134 | 332 | 3134 | | GO OFFB |
| 1007* | 3116 | 011 | 3135 | | EXC+ |
| 1008* | 3147 | 370 | 3136 | | GO FFB? |
| 1009* | 3123 | 053 | 3137 | | LB 2,11 |
| 1010* | 3111 | 106 | 3140 | | TM 4 |
| 1011* | 3144 | 304 | 3141 | | GO RSFRM |
| 1012* | 3122 | 117 | 3142 | | SM |
| 1013* | 3151 | 332 | 3143 | | GO OFFB |
| 1014* | 3164 | 113 | 3144 | RSFRM | RSM |
| 1015* | 3132 | 072 | 3145 | OFFB | LB 3,5 |
| 1016* | 3155 | 105 | 3146 | | TM 6 |
| 1017* | 3166 | 354 | 3147 | | GO DSP1 |
| 1018* | 3173 | 075 | 3150 | | LB 3,13 |
| 1019* | 3135 | 003 | 3151 | | SC |
| 1020* | 3156 | 060 | 3152 | | OTA |
| 1021* | 3167 | 040 | 3153 | | COMP |
| 1022* | 3133 | 042 | 3154 | | SUB |
| 1023* | 3115 | 000 | 3155 | | NOP |
| 1024* | 3146 | 011 | 3156 | | EXC+ |
| 1025* | 3163 | 115 | 3157 | | TC |
| 1026* | 3131 | 353 | 3160 | | GO INCDTC |
| 1027* | 3154 | 144 | 3161 | DSP1 | LG 27 |
| 1028* | 3126 | 317 | 3162 | | GO DSP2 |
| 1029* | 3153 | 142 | 3163 | INCDTC | LG 32 |
| 1030* | 3125 | 025 | 3164 | | CALL INCDC |
| 1031* | 3152 | 354 | 3165 | | GO DSP1 |
| 1032* | 3165 | 017 | 3166 | | LB 0,15 |
| 1033* | 3172 | 045 | 3167 | | BTD |
| 1034* | 3175 | 100 | 3170 | | RET |
| 1035* | 3176 | 037 | 3171 | GET1 | LB 1,15 |
| 1036* | 3177 | 006 | 3172 | | MTA |
| 1037* | 3137 | 001 | 3173 | | MXA |

| | | | | | |
|---|---|---|---|---|---|
| 1038* | 3117 | 100 | 3174 | | RET |
| 1039* | 3107 | 001 | 3175 | PUT1 | HXBR |
| 1040* | 3103 | 007 | 3176 | | EXC |
| 1041* | 3101 | 100 | 3177 | | RET |
| 1042* | | CODE | | | PAGE 52 |
| 1043* | 3200 | 033 | 3200 | PLUS2 | LB 1,11 |
| 1044* | 3240 | 175 | 3201 | | LM 13 |
| 1045* | 3220 | 107 | 3202 | | TM 8 |
| 1046* | 3210 | 321 | 3203 | | GO CLCSUM |
| 1047* | 3204 | 271 | 3204 | | CALL LB1,6 |
| 1048* | 3202 | 006 | 3205 | | MTA |
| 1049* | 3241 | 136 | 3206 | | ADX 14 |
| 1050* | 3260 | 323 | 3207 | | GO SHFDGT |
| 1051* | 3230 | 274 | 3210 | | CALL LB2,6 |
| 1052* | 3214 | 006 | 3211 | | MTA |
| 1053* | 3600 | 136 | 3212 | | ADX 14 |
| 1054* | 3643 | 323 | 3213 | | GO SHFDGT |
| 1055* | 3221 | 043 | 3214 | CLCSUM | RSC |
| 1056* | 3650 | 032 | 3215 | | LB 1,5 |
| 1057* | 3224 | 066 | 3216 | | MTA 5 |
| 1058* | 3212 | 002 | 3217 | | ADD |
| 1059* | 3245 | 126 | 3220 | | ADX 0 |
| 1060* | 3262 | 012 | 3221 | | LB 0,5 |
| 1061* | 3271 | 031 | 3222 | | EXC+ 1 |
| 1062* | 3274 | 066 | 3223 | | MTA 5 |
| 1063* | 3230 | 002 | 3224 | | ADD |
| 1064* | 3257 | 126 | 3225 | | ADX 6 |
| 1065* | 3227 | 262 | 3226 | | CALL LB0,6 |
| 1066* | 3213 | 007 | 3227 | | EXC |
| 1067* | 3205 | 115 | 3230 | | TC |
| 1068* | 3242 | 370 | 3231 | | GO GT99 |
| 1069* | 3261 | 100 | 3232 | | RET |
| 1070* | 3270 | 053 | 3233 | GT99 | LB 2,11 |
| 1071* | 3234 | 106 | 3234 | | TM 4 |
| 1072* | 3216 | 351 | 3235 | | GO INB |
| 1073* | 3247 | 274 | 3236 | | CALL LB2,6 |
| 1074* | 3223 | 060 | 3237 | SHFDGT | OTA |
| 1075* | 3211 | 010 | 3240 | | EXC- |
| 1076* | 3244 | 007 | 3241 | | EXC |
| 1077* | 3222 | 321 | 3242 | | GO CLCSUM |
| 1078* | 3251 | 271 | 3243 | INB | CALL LB1,6 |
| 1079* | 3264 | 323 | 3244 | | GO SHFDGT |
| 1080* | 3232 | 074 | 3245 | DECOD2 | LB 3,12 |
| 1081* | 3255 | 106 | 3246 | | TM 4 |
| 1082* | 3266 | 101 | 3247 | | RETS |
| 1083* | 3273 | 073 | 3250 | | LB 3,11 |
| 1084* | 3235 | 006 | 3251 | | MTA |
| 1085* | 3256 | 134 | 3252 | | ADX 12 |
| 1086* | 3267 | 100 | 3253 | | RET |
| 1087* | 3233 | 101 | 3254 | | RETS |
| 1088* | 3215 | 003 | 3255 | DSP00 | SC |
| 1089* | 3246 | 060 | 3256 | DSPP | OTA |
| 1090* | 3263 | 040 | 3257 | | COMP |
| 1091* | 3231 | 021 | 3260 | | DSPS 1 |
| 1092* | 3254 | 100 | 3261 | DISPE | RET |
| 1093* | 3226 | 043 | 3262 | DSP11 | RSC |
| 1094* | 3253 | 346 | 3263 | | GO DSPP |
| 1095* | 3225 | 060 | 3264 | INCDC | OTA |
| 1096* | 3252 | 040 | 3265 | | COMP |
| 1097* | 3265 | 042 | 3266 | | SUB |
| 1098* | 3272 | 000 | 3267 | | NOP |
| 1099* | 3275 | 011 | 3270 | | EXC+ |
| 1100* | 3276 | 325 | 3271 | | GO INCDC |
| 1101* | 3277 | 115 | 3272 | | TC |
| 1102* | 3237 | 307 | 3273 | | GO TIMEUP |
| 1103* | 3217 | 100 | 3274 | | RET |
| 1104* | 3207 | 063 | 3275 | TIMEUP | LDF |
| 1105* | 3203 | 075 | 3276 | | 3,13 |
| 1106* | 3201 | 101 | 3277 | | RETS |
| 1107* | | CODE | | | PAGE 53 |
| 1108* | 3300 | 033 | 3300 | MLT | LB 1,11 |
| 1109* | 3340 | 164 | 3301 | | LM 4 |
| 1110* | 3320 | 032 | 3302 | | LB 1,5 |
| 1111* | 3310 | 046 | 3303 | MOVB | MTA 2 |
| 1112* | 3304 | 051 | 3304 | | EXC+ 2 |

| | | | | | |
|---|---|---|---|---|---|
| 1113* | 3302 | 046 | 3305 | MTA | 2 |
| 1114* | 3341 | 007 | 3306 | EXC | |
| 1115* | 3360 | 032 | 3307 | BO? LB | 1,5 |
| 1116* | 3330 | 060 | 3310 | OTA | |
| 1117* | 3314 | 062 | 3311 | TAM | |
| 1118* | 3300 | 336 | 3312 | GO | ADDMLT |
| 1119* | 3343 | 011 | 3313 | EXC+ | |
| 1120* | 3321 | 062 | 3314 | TAM | |
| 1121* | 3350 | 336 | 3315 | GO | ADDMLT |
| 1122* | 3324 | 072 | 3316 | LB | 3,5 |
| 1123* | 3312 | 046 | 3317 | MTA | 2 |
| 1124* | 3345 | 051 | 3320 | EXC+ | 2 |
| 1125* | 3362 | 046 | 3321 | MTA | 2 |
| 1126* | 3371 | 007 | 3322 | EXC | |
| 1127* | 3374 | 100 | 3323 | RET | |
| 1128* | 3336 | 043 | 3324 | ADDMLT RSC | |
| 1129* | 3357 | 052 | 3325 | LB | 2,5 |
| 1130* | 3327 | 046 | 3326 | MTA | 2 |
| 1131* | 3313 | 002 | 3327 | ADD | |
| 1132* | 3305 | 126 | 3330 | ADX | 0 |
| 1133* | 3342 | 051 | 3331 | EXC+ | 2 |
| 1134* | 3361 | 046 | 3332 | MTA | 2 |
| 1135* | 3370 | 002 | 3333 | ADD | |
| 1136* | 3334 | 126 | 3334 | ADX | 0 |
| 1137* | 3310 | 007 | 3335 | EXC | |
| 1138* | 3347 | 115 | 3336 | TC | |
| 1139* | 3323 | 356 | 3337 | GO | OVERF |
| 1140* | 3311 | 032 | 3340 | LB | 1,5 |
| 1141* | 3344 | 060 | 3341 | OTA | |
| 1142* | 3322 | 042 | 3342 | SUB | |
| 1143* | 3351 | 132 | 3343 | ADX | 10 |
| 1144* | 3364 | 011 | 3344 | EXC+ | |
| 1145* | 3332 | 060 | 3345 | OTA | |
| 1146* | 3355 | 042 | 3346 | SUB | |
| 1147* | 3366 | 132 | 3347 | ADX | 10 |
| 1148* | 3373 | 007 | 3350 | EXC | |
| 1149* | 3335 | 360 | 3351 | GO | BO? |
| 1150* | 3356 | 053 | 3352 | OVERF LB | 2,11 |
| 1151* | 3367 | 105 | 3353 | TM | 2 |
| 1152* | 3333 | 363 | 3354 | GO | TBL |
| 1153* | 3315 | 274 | 3355 | CALL | LB2,6 |
| 1154* | 3346 | 326 | 3356 | GO | SHFFAC |
| 1155* | 3363 | 072 | 3357 | TBL LB | 3,5 |
| 1156* | 3331 | 217 | 3360 | CALL | ZER2 |
| 1157* | 3354 | 352 | 3361 | GO | ZRC |
| 1158* | 3320 | 060 | 3362 | SHFFAC OTA | |
| 1159* | 3353 | 010 | 3363 | EXC- | |
| 1160* | 3325 | 007 | 3364 | EXC | |
| 1161* | 3352 | 277 | 3365 | ZRC CALL | ZERC |
| 1162* | 3365 | 072 | 3366 | LB | 3,5 |
| 1163* | 3372 | 310 | 3367 | GO | MOVB |
| 1164* | 3375 | 012 | 3370 | BKD LB | 0,5 |
| 1165* | 3376 | 204 | 3371 | CALL | BLNKD |
| 1166* | 3377 | 032 | 3372 | LB | 1,5 |
| 1167* | 3337 | 204 | 3373 | CALL | BLNKD |
| 1168* | 3317 | 052 | 3374 | LB | 2,5 |
| 1169* | 3307 | 204 | 3375 | CALL | BLNKD |
| 1170* | 3303 | 234 | 3376 | CALL | OFF= |
| 1171* | 3301 | 100 | 3377 | RET | |
| 1172* | | CODE | | PAGE | 34 |
| 1173* | 3400 | 060 | 3400 | NR1 OTA | |
| 1174* | 3440 | 061 | 3401 | HXA | |
| 1175* | 3420 | 001 | 3402 | HXBR | |
| 1176* | 3410 | 061 | 3403 | HXA | |
| 1177* | 3404 | 121 | 3404 | ADX | 1 |
| 1178* | 3402 | 000 | 3405 | NOP | |
| 1179* | 3441 | 017 | 3406 | LB | 0,15 |
| 1180* | 3460 | 007 | 3407 | EXC | |
| 1181* | 3430 | 061 | 3410 | HXA | |
| 1182* | 3414 | 006 | 3411 | MTA | |
| 1183* | 3400 | 061 | 3412 | HXA | |
| 1184* | 3443 | 007 | 3413 | EXC | |
| 1185* | 3421 | 001 | 3414 | HXBR | |
| 1186* | 3450 | 134 | 3415 | ADX | 12 |
| 1187* | 3424 | 101 | 3416 | RETS | |

| | | | | | | |
|---|---|---|---|---|---|---|
| 1188* | 3412 | 100 | 3417 | | RET | |
| 1189* | 3445 | 053 | 3420 | NORML? | LB | 2,11 |
| 1190* | 3462 | 104 | 3421 | | TM | 4 |
| 1191* | 3471 | 101 | 3422 | | RETS | |
| 1192* | 3474 | 100 | 3423 | | RET | |
| 1193* | 3430 | 057 | 3424 | XFER | LB | 2,15 |
| 1194* | 3457 | 006 | 3425 | | MTA | |
| 1195* | 3427 | 274 | 3426 | | CALL | LB2,6 |
| 1196* | 3413 | 007 | 3427 | | EXC | |
| 1197* | 3405 | 056 | 3430 | | LB | 2,14 |
| 1198* | 3442 | 006 | 3431 | | MTA | |
| 1199* | 3461 | 052 | 3432 | | LB | 2,5 |
| 1200* | 3470 | 007 | 3433 | | EXC | |
| 1201* | 3434 | 055 | 3434 | | LB | 2,13 |
| 1202* | 3410 | 006 | 3435 | | MTA | |
| 1203* | 3447 | 032 | 3436 | | LB | 1,5 |
| 1204* | 3423 | 007 | 3437 | | EXC | |
| 1205* | 3411 | 060 | 3440 | | OTA | |
| 1206* | 3444 | 062 | 3441 | | TAM | |
| 1207* | 3422 | 100 | 3442 | | RET | |
| 1208* | 3451 | 071 | 3443 | | EXC+ | 3 |
| 1209* | 3464 | 070 | 3444 | | EXC- | 3 |
| 1210* | 3432 | 007 | 3445 | | EXC | |
| 1211* | 3455 | 100 | 3446 | | RET | |
| 1212* | 3460 | 100 | 3447 | | RET | |
| 1213* | 3473 | 274 | 3450 | ZERBLK | CALL | LB2,6 |
| 1214* | 3435 | 060 | 3451 | | OTA | |
| 1215* | 3450 | 062 | 3452 | | TAM | |
| 1216* | 3467 | 315 | 3453 | | GO | CZ? |
| 1217* | 3433 | 177 | 3454 | | LM | 15 |
| 1218* | 3415 | 262 | 3455 | CZ? | CALL | LB0,6 |
| 1219* | 3446 | 062 | 3456 | | TAM | |
| 1220* | 3463 | 354 | 3457 | | GO | BZ? |
| 1221* | 3431 | 177 | 3460 | | LM | 15 |
| 1222* | 3454 | 271 | 3461 | BZ? | CALL | LB1,6 |
| 1223* | 3426 | 062 | 3462 | | TAM | |
| 1224* | 3453 | 317 | 3463 | | GO | 16BLK? |
| 1225* | 3425 | 032 | 3464 | SWP56 | LB | 1,5 |
| 1226* | 3452 | 006 | 3465 | | MTA | |
| 1227* | 3465 | 177 | 3466 | | LM | 15 |
| 1228* | 3472 | 121 | 3467 | | ADX | 1 |
| 1229* | 3475 | 100 | 3470 | | RET | |
| 1230* | 3476 | 137 | 3471 | | ADX | 15 |
| 1231* | 3477 | 007 | 3472 | | EXC | |
| 1232* | 3437 | 100 | 3473 | | RET | |
| 1233* | 3417 | 040 | 3474 | 16BLK? | COMP | |
| 1234* | 3407 | 062 | 3475 | | TAM | |
| 1235* | 3403 | 100 | 3476 | | RET | |
| 1236* | 3401 | 325 | 3477 | | GO | SWP56 |
| 1237* | | CODE | | | PAGE | 35 |
| 1238* | 3500 | 060 | 3500 | AD1 | OTA | |
| 1239* | 3540 | 002 | 3501 | | ADD | |
| 1240* | 3520 | 126 | 3502 | | ADX | 6 |
| 1241* | 3510 | 011 | 3503 | | EXC+ | |
| 1242* | 3504 | 000 | 3504 | | NOP | |
| 1243* | 3502 | 100 | 3505 | | RET | |
| 1244* | 3541 | 037 | 3506 | ANSA | LB | 1,15 |
| 1245* | 3560 | 102 | 3507 | | LM | 2 |
| 1246* | 3530 | 052 | 3510 | | LB | 2,5 |
| 1247* | 3514 | 141 | 3511 | | LG | 35 |
| 1248* | 3500 | 255 | 3512 | | CALL | GETR |
| 1249* | 3543 | 274 | 3513 | | CALL | LB2,6 |
| 1250* | 3521 | 361 | 3514 | | GO | LAST |
| 1251* | 3550 | 037 | 3515 | ANSB | LB | 1,15 |
| 1252* | 3524 | 161 | 3516 | | LM | 1 |
| 1253* | 3512 | 032 | 3517 | | LB | 1,5 |
| 1254* | 3545 | 141 | 3520 | | LG | 35 |
| 1255* | 3562 | 255 | 3521 | | CALL | GETR |
| 1256* | 3571 | 271 | 3522 | | CALL | LB1,6 |
| 1257* | 3574 | 361 | 3523 | | GO | LAST |
| 1258* | 3530 | 037 | 3524 | ANSC | LB | 1,15 |
| 1259* | 3557 | 160 | 3525 | | LM | 0 |
| 1260* | 3527 | 012 | 3526 | | LB | 2,5 |
| 1261* | 3513 | 141 | 3527 | | LG | 35 |
| 1262* | 3505 | 255 | 3530 | | CALL | GETR |

| | | | | | |
|---|---|---|---|---|---|
| 1263* | 3542 | 262 | 3531 | CALL | LB0,6 |
| 1264* | 3561 | 006 | 3532 | LAST MTA | |
| 1265* | 3570 | 036 | 3533 | LB | 1,14 |
| 1266* | 3534 | 007 | 3534 | EXC | |
| 1267* | 3516 | 100 | 3535 | RET | |
| 1268* | 3547 | 052 | 3536 | AU? LB | 2,5 |
| 1269* | 3523 | 060 | 3537 | OTA | |
| 1270* | 3511 | 062 | 3540 | TAM | |
| 1271* | 3244 | 100 | 3541 | RET | |
| 1272* | 3522 | 011 | 3542 | EXC+ | |
| 1273* | 3551 | 062 | 3543 | TAM | |
| 1274* | 3564 | 100 | 3544 | RET | |
| 1275* | 3532 | 101 | 3545 | RETS | |
| 1276* | 3555 | 006 | 3546 | GETR MTA | |
| 1277* | 3566 | 035 | 3547 | LB | 1,13 |
| 1278* | 3573 | 007 | 3550 | EXC | |
| 1279* | 3535 | 100 | 3551 | RET | |
| 1280* | 3556 | 006 | 3552 | SHIFT MTA | |
| 1281* | 3567 | 014 | 3553 | LB | 0,12 |
| 1282* | 3533 | 010 | 3554 | SHFT0 EXC- | |
| 1283* | 3515 | 333 | 3555 | GO | SHFT0 |
| 1284* | 3546 | 100 | 3556 | RET | |
| 1285* | 3563 | 271 | 3557 | SWPAB CALL | LB1,6 |
| 1286* | 3531 | 006 | 3560 | SWAP1 MTA | |
| 1287* | 3554 | 067 | 3561 | EXC | |
| 1288* | 3526 | 010 | 3562 | EXC- | |
| 1289* | 3553 | 331 | 3563 | GO | SWAP1 |
| 1290* | 3525 | 100 | 3564 | RET | |
| 1291* | 3552 | 262 | 3565 | SWPAC CALL | LB0,6 |
| 1292* | 3565 | 046 | 3566 | SWAP2 MTA | |
| 1293* | 3572 | 047 | 3567 | EXC | |
| 1294* | 3575 | 010 | 3570 | EXC- | |
| 1295* | 3576 | 365 | 3571 | GO | SWAP2 |
| 1296* | 3577 | 100 | 3572 | RET | |
| 1297* | 3537 | 275 | 3573 | ZERDSP CALL | ZERA |
| 1298* | 3517 | 276 | 3574 | CALL | ZERB |
| 1299* | 3507 | 277 | 3575 | CALL | ZERC |
| 1300* | 3503 | 237 | 3576 | CALL | ZERNTR |
| 1301* | 3501 | 100 | 3577 | RET | |
| 1302* | | CODE | | PAGE | 36 |
| 1303* | 3600 | 023 | 3600 | LB00,6 LBL | 0,6 |
| 1304* | 3040 | 006 | 3601 | | |
| 1305* | 3020 | 100 | 3602 | RET | |
| 1306* | 3010 | 023 | 3603 | LB01,6 LBL | 1,6 |
| 1307* | 3604 | 026 | 3604 | | |
| 1308* | 3002 | 100 | 3605 | RET | |
| 1309* | 3041 | 023 | 3606 | LB02,6 LBL | 2,6 |
| 1310* | 3660 | 046 | 3607 | | |
| 1311* | 3030 | 100 | 3610 | RET | |
| 1312* | 3014 | 023 | 3611 | LB0210 LBL | 2,10 |
| 1313* | 3606 | 052 | 3612 | | |
| 1314* | 3043 | 100 | 3613 | RET | |
| 1315* | 3621 | 023 | 3614 | LB03,7 LBL | 3,7 |
| 1316* | 3650 | 067 | 3615 | | |
| 1317* | 3024 | 100 | 3616 | RET | |
| 1318* | 3012 | 023 | 3617 | LB03,8 LBL | 3,8 |
| 1319* | 3645 | 070 | 3620 | | |
| 1320* | 3062 | 100 | 3621 | RET | |
| 1321* | 3671 | 023 | 3622 | LB03,9 LBL | 3,9 |
| 1322* | 3074 | 071 | 3623 | | |
| 1323* | 3039 | 100 | 3624 | RET | |
| 1324* | 3657 | 060 | 3625 | TIMA OTA | |
| 1325* | 3027 | 122 | 3626 | ADX | 2 |
| 1326* | 3013 | 000 | 3627 | NOP | |
| 1327* | 3605 | 023 | 3630 | LBL | 3,7 |
| 1328* | 3042 | 067 | 3631 | | |
| 1329* | 3661 | 107 | 3632 | TM | 0 |
| 1330* | 3070 | 127 | 3633 | ADX | 7 |
| 1331* | 3634 | 000 | 3634 | NOP | |
| 1332* | 3016 | 076 | 3635 | LB | 3,14 |
| 1333* | 3647 | 011 | 3636 | EXC+ | |
| 1334* | 3623 | 177 | 3637 | 15TEST CM | 15 |
| 1335* | 3011 | 023 | 3640 | TEST LBL | 3,7 |
| 1336* | 3644 | 067 | 3641 | | |
| 1337* | 3622 | 106 | 3642 | TM | 4 |

| | | | | | | |
|---|---|---|---|---|---|---|
| 1338* | 3051 | 372 | 3643 | | GO | TIME |
| 1339* | 3064 | 100 | 3644 | | RET | |
| 1340* | 3032 | 060 | 3645 | TIMB | OTA | |
| 1341* | 3055 | 130 | 3646 | | ADX | 6 |
| 1342* | 3066 | 000 | 3647 | | NOP | |
| 1343* | 3673 | 023 | 3650 | | LBL | |
| 1344* | 3035 | 067 | 3651 | | | 3,7 |
| 1345* | 3056 | 107 | 3652 | | TM | 8 |
| 1346* | 3067 | 125 | 3653 | | ADX | 5 |
| 1347* | 3633 | 000 | 3654 | | NOP | |
| 1348* | 3615 | 077 | 3655 | | LB | 3,15 |
| 1349* | 3046 | 007 | 3656 | | EXC | |
| 1350* | 3063 | 311 | 3657 | | GO | TEST |
| 1351* | 3031 | 076 | 3660 | TIMC | LB | 3,14 |
| 1352* | 3054 | 174 | 3661 | | LM | 12 |
| 1353* | 3626 | 323 | 3662 | | GO | ISTEST |
| 1354* | 3653 | 076 | 3663 | TIMD | LB | 3,14 |
| 1355* | 3025 | 162 | 3664 | | LM | 2 |
| 1356* | 3652 | 176 | 3665 | | LM | 14 |
| 1357* | 3665 | 311 | 3666 | | GO | TEST |
| 1358* | 3672 | 075 | 3667 | TIME | LB | 3,13 |
| 1359* | 3075 | 174 | 3670 | | LM | 12 |
| 1360* | 3076 | 177 | 3671 | BLKDSP | LM | 15 |
| 1361* | 3677 | 177 | 3672 | | LM | 15 |
| 1362* | 3037 | 100 | 3673 | | RET | |
| 1363* | 3617 | 100 | 3674 | ZERO3 | LM | 0 |
| 1364* | 3007 | 160 | 3675 | ZERO | LM | 0 |
| 1365* | 3603 | 160 | 3676 | | LM | 0 |
| 1366* | 3001 | 100 | 3677 | | RET | |
| 1367* | | CODE | | | PAGE | 57 |
| 1368* | 3700 | 141 | 3700 | ADD1 | LG | 35 |
| 1369* | 3740 | 300 | 3701 | | GO | AD1 |
| 1370* | 3720 | 142 | 3702 | BLANKD | LG | 33 |
| 1371* | 3710 | 375 | 3703 | | GO | BKD |
| 1372* | 3704 | 376 | 3704 | BLNKD | GO | BLKDSP |
| 1373* | 3702 | 144 | 3705 | DSPLAY | LG | 27 |
| 1374* | 3741 | 344 | 3706 | | GO | DISPLA |
| 1375* | 3760 | 142 | 3707 | DSPFF0 | LG | 32 |
| 1376* | 3730 | 115 | 3710 | | GO | DSP00 |
| 1377* | 3714 | 142 | 3711 | DSPFF1 | LG | 32 |
| 1378* | 3706 | 126 | 3712 | | GO | DSP11 |
| 1379* | 3743 | 145 | 3713 | EX= | LG | 25 |
| 1380* | 3721 | 337 | 3714 | | GO | EXC= |
| 1381* | 3750 | 143 | 3715 | GET | LG | 31 |
| 1382* | 3724 | 376 | 3716 | | GO | GET1 |
| 1383* | 3712 | 156 | 3717 | HOLD | LG | 2 |
| 1384* | 3745 | 151 | 3720 | | GO | HOLD1 |
| 1385* | 3762 | 300 | 3721 | LB0,6 | GO | LB00,6 |
| 1386* | 3771 | 310 | 3722 | LB1,6 | GO | LB01,6 |
| 1387* | 3774 | 341 | 3723 | LB2,6 | GO | LB02,6 |
| 1388* | 3736 | 314 | 3724 | LB2,10 | GO | LB0210 |
| 1389* | 3757 | 321 | 3725 | LB3,7 | GO | LB03,7 |
| 1390* | 3727 | 312 | 3726 | LB3,8 | GO | LB03,8 |
| 1391* | 3713 | 371 | 3727 | LB3,9 | GO | LB03,9 |
| 1392* | 3705 | 142 | 3730 | MLTPLY | LG | 33 |
| 1393* | 3742 | 300 | 3731 | | GO | MLT |
| 1394* | 3761 | 141 | 3732 | NR | LG | 34 |
| 1395* | 3770 | 100 | 3733 | | GO | NR1 |
| 1396* | 3734 | 147 | 3734 | OFF= | LG | 20 |
| 1397* | 3716 | 107 | 3735 | | GO | OFF== |
| 1398* | 3747 | 142 | 3736 | PLUS | LG | 32 |
| 1399* | 3723 | 100 | 3737 | | GO | PLUS2 |
| 1400* | 3711 | 143 | 3740 | PUT | LG | 31 |
| 1401* | 3744 | 307 | 3741 | | GO | PUT1 |
| 1402* | 3722 | 144 | 3742 | RCV | LG | 26 |
| 1403* | 3751 | 113 | 3743 | | GO | RCVA |
| 1404* | 3764 | 144 | 3744 | RCVDGT | LG | 27 |
| 1405* | 3732 | 362 | 3745 | | GO | RCVDT |
| 1406* | 3755 | 141 | 3746 | SHFT | LG | 35 |
| 1407* | 3760 | 356 | 3747 | | GO | SHIFT |
| 1408* | 3773 | 141 | 3750 | SWAPAB | LG | 35 |
| 1409* | 3735 | 363 | 3751 | | GO | SWPAB |
| 1410* | 3756 | 141 | 3752 | SWAPAC | LG | 35 |
| 1411* | 3767 | 352 | 3753 | | GO | SWPAC |

```
1412*  3733  357  3754  TIMEA    GO        TIMA
1413*  3715  332  3755  TIMEB    GO        TIMB
1414*  3746  331  3756  TIMEC    GO        TIMC
1415*  3763  353  3757  TIMED    GO        TIMD
1416*  3731  144  3760  XMIT     LG   26
1417*  3754  100  3761           GO        XMITA
1418*  3726  144  3762  XMTOGT   LG   27
1419*  3753  300  3763           GO        XMITOT
1420*  3725  141  3764  ZBLK     LG   34
1421*  3752  173  3765           GO        ZERBLK
1422*  3765  146  3766  ZERTIM   LG   22
1423*  3772  107  3767           GO        ZTIMER
1424*  3775  052  3770  ZERA     LB        2,5
1425*  3776  032  3771  ZERB     LB        1,5
1426*  3777  012  3772  ZERC     LB        0,5
1427*  3737  015  3773  ZERNTR   LB        0,13
1428*  3717  307  3774  ZERZ     GO        ZERO
1429*  3707  023  3775  ZERR     LRL
1430*  3703  070  3776                3,8
1431*  3701  317  3777  ZER3     GO        ZERO3
1432*                                 END

1/26/76  09:35:03  TOAL  G245AA0K2  000245    1    100

133*   KEYDWN,KEYDWN,PUW
134*   KEYUP,KEYUP
135*   DSPLOC,DSPLOC,KEYUP
136*   KB1
137*   N,N,B,7,4,1,S
138*   KB2
139*   N,N,P,8,5,2,F
140*   KB3
141*   N,N,A,9,6,3,0
142*   KB4
143*   N,*,T,/,X,-,+

[N
```

What is claimed is:

1. Apparatus for allowing two or more substantially identical calculators to operate in a competition mode comprising:
 a. A first calculator having a display and manually-operable input keys;
 b. Master/slave means at said first calculator for causing said calculator to operate as a master or a slave depending upon whether said means is energized or not, respectively;
 c. Means adapted to interconnect said first calculator with a second calculator, including means energizable for designating said first calculator as the master, exclusively; and
 d. Control means in said first calculator responsive to said master/slave means and said input keys for generating parameters describing a problem to be solved, said means being activated only upon the condition that said first calculator is energized as a master.

2. The combination, according to claim 1, wherein said energizing means is adapted to receive a pluggable cable, which cable includes means within one plug for energizing said interconnect means.

3. The combination, according to claim 1, wherein said control means includes:
 a. Means responsive to said master/slave means for causing said first calculator, when energized as a master, to display said problem from said generated parameters;
 b. Means for transmitting said parameters to said second calculator upon the condition that said first calculator is energized as a master; and
 c. Means in said first calculator responsive to said transmission means upon the condition that said first calculator is energized as a slave calculator for causing said first calculator to display a problem from parameters transmitted to said first calculator from said second calculator.

4. Apparatus for allowing two or more substantially identical calculators to operate in a competition mode comprising:
 a. First and second calculators having a display and manually-operable input keys;
 b. Master/slave means in each calculator for causing a calculator to operate as either a master or a slave depending upon whether said means is energized or not, respectively;
 c. Means interconnecting said first and second calculators, including means for energizing one of said calculators as a master, the other of said calculators being a slave, exclusively; and d. Means in each calculator responsive to said master/slave means and said input keys for selecting a type of problem to be solved, said means being activated only in the calculator energized as a master.

5. The combination, according to claim 4, wherein said selecting means further includes:
   a. Means for generating parameters describing a problem to be solved;
   b. Means responsive to said master/slave means for causing the calculator energized as a master to display a problem from said generated parameters;
   c. Means for transmitting said parameters to said slave calculator; and
   d. Means in said slave calculator responsive to said transmission means for causing said slave calculator to display the same problem displayed by said master calculator;
   whereby said first and said second calculators both display the same generated problem by means of their own internal circuitry, such that both calculators can be manipulated to solve said problem.

6. Apparatus for allowing two or more substantially identical calculators to operate in a competition mode comprising:
   a. A calculator having a display and manually-operable input keys;
   b. Master/slave means at said calculator for causing said calculator to operate as a master or a slave depending upon whether said means is energized or not, respectively;
   c. A cable adapted to interconnect said calculator with another calculator, said cable including plug connectors at each end, only one of said connectors being adapted to energize said master/slave means for designating one of said calculators as the master, exclusively; and
   d. Control means in said calculator responsive to said master/slave means and said input keys for generating parameters describing a problem to be solved, said means being activated only upon the condition that said calculator is energized as a master.

7. The combination, according to claim 6, wherein said control means includes:
   a. Means responsive to said master/slave means for causing said calculator, when energized as a master, to display said problem from said generated parameters; and
   b. Means for transmitting over said cable said parameters upon the condition that said calculator is energized as a master.

8. The combination, according to claim 7, wherein said control means further includes:
   means responsive upon the condition that said calculator is energized as a slave calculator for causing said calculator to to display a problem from parameters transmitted to said calculator over said cable.

9. Apparatus for enabling competition between users of educational calculators comprising:
   a. First and second calculators each having a display and manually-operable input keys;
   b. Master/slave means at said first and second calculators for causing said calculators to operate as a master or a slave depending upon whether said means is energized or not, respectively;
   c. A cable adapted to interconnect said first calculator with said second calculator, said cable including asymmetrical plug connectors for energizing only one of said calculators as the master, exclusively; and
   d. Control means in said first and second calculators responsive to said master/slave means and said input keys for generating parameters describing a problem to be solved, said means being activated only in the calculator which is energized as a master.

10. The combination, according to claim 9, wherein said control means includes:
    a. Means responsive to said master/slave means for causing said first calculator, when energized as a master, to display said problem from said generated parameters;
    b. Means for transmitting over said cable said parameters to said second calculator upon the condition that said first calculator is energized as a master; and
    c. Means in said second calculator, responsive to said transmission means, upon the condition that said second calculator is operable as a slave calculator, for causing said second calculator to display a problem from parameters transmitted to said second calculator from said first calculator.

11. The method of operating first and second calculators in a competition mode, each of said calculators having a display and manually-operable input keys, comprising the steps of:
    a. Interconnecting said first and second calculators in such a way that one of said calculators is energized as a master, the other of said calculators being a slave; and
    b. Displaying function symbols representing a type of problem to be solved only on the display of the calculator energized as a master, the display of said slave not displaying said function symbols; whereby the fact that said symbols are displayed indicates to the user of said calculator energized as a master that said user is to select, by means of said input keys, one of the displayed function symbols.

12. The method according to claim 11, further comprising the steps of:
    c. Generating parameters describing a problem to be solved in response to the depression of a function key on said calculator energized as a master;
    d. Displaying, on the display of said calculator energized as a master, a problem created from said generated parameters;
    e. Transmitting said parameters to said slave calculator; and
    f. Displaying, on the display of said slave calculator, a problem created from said transmitted parameters, such that the same problem is displayed on both said master calculator and said slave calculator; wherein users of said first and second calculators are enabled to manipulate said manually-operable input keys to solve said problem in competition with each other.

13. The method according to claim 12, further comprising the steps of:
    g. Recording the time it takes users of said first and second calculators to enter a proposed answer to said displayed problems,
    h. Transmitting an indication that a user of the master calculator entered an answer, to said slave calculator;
    i. Transmitting an indication of whether or not said master calculator answered first from said slave calculator to said master calculator; and j. Transmitting a score, weighted by which calculator answered correctly, and first, from said master calculator to said slave calculator, and from said slave calculator to said master calculator.

14. The method according to claim 13, further comprising the steps of:

k. Counting the number of problems which have been displayed; and l. Changing the master/slave relationship such that the master calculator is designated as slave, and vice versa, upon the condition that a predetermined number of problems have been displayed.

* * * * *